[12] United States Patent
Dubesset et al.

(10) Patent No.: US 10,292,040 B2
(45) Date of Patent: May 14, 2019

(54) METHODS AND APPARATUS FOR FACILITATING LTE ROAMING BETWEEN HOME AND VISITED OPERATORS

(71) Applicant: MOBILEUM, INC., Santa Clara, CA (US)

(72) Inventors: Laurent Dubesset, Magny les Hameaux (FR); David Gillot, Brussels (BE)

(73) Assignee: ROAMWARE, INC., Cupertino, CA (US)

(*) Notice: Subject to any disclaimer, the term of this patent is extended or adjusted under 35 U.S.C. 154(b) by 0 days.

(21) Appl. No.: 14/781,280

(22) PCT Filed: Mar. 28, 2014

(86) PCT No.: PCT/US2014/032171
§ 371 (c)(1),
(2) Date: Sep. 29, 2015

(87) PCT Pub. No.: WO2014/160935
PCT Pub. Date: Oct. 2, 2014

(65) Prior Publication Data
US 2016/0165432 A1 Jun. 9, 2016

Related U.S. Application Data

(60) Provisional application No. 61/806,703, filed on Mar. 29, 2013.

(51) Int. Cl.
*H04W 8/12* (2009.01)
*H04W 12/06* (2009.01)
(Continued)

(52) U.S. Cl.
CPC ............. *H04W 8/12* (2013.01); *H04W 4/14* (2013.01); *H04W 12/06* (2013.01); *H04W 76/12* (2018.02)

(58) Field of Classification Search
CPC ......... H04W 8/12; H04W 4/14; H04W 12/06; H04W 76/022
(Continued)

(56) References Cited

U.S. PATENT DOCUMENTS

2004/0224680 A1 11/2004 Jiang
2005/0233740 A1* 10/2005 Jiang .................. H04W 4/02
455/432.1
(Continued)

FOREIGN PATENT DOCUMENTS

WO WO 2009/018533 A2 2/2009
WO WO 2011/098155 A1 8/2011
(Continued)

OTHER PUBLICATIONS

International Search Report and Written Opinion of PCT/US2014/032171 dated Aug. 28, 2014.
(Continued)

*Primary Examiner* — Marcus Hammonds
(74) *Attorney, Agent, or Firm* — Arent Fox LLP

(57) ABSTRACT

Example methods, apparatuses, and systems are presented for enabling and facilitating roaming of subscribers of a Home Public Mobile Network (HPMN) equipped with Long-Term Evolution (LTE) devices into LTE access network of a Visited Public Mobile Network (VPMN) under certain circumstances that are not supported by specifications promulgated by the Third Generation Partnership Project (3GPP) or the Global System for Mobile Association (GSMA). For example, a method for managing mobile device roaming is presented that includes receiving, at a gateway associated with the VPMN, a request message from an LTE device associated with the HPMN, wherein the request message requests wireless access to an LTE access network associated with the VPMN, enabling, at the gate-
(Continued)

way, registration of the LTE device to the LTE access network associated with the VPMN, and providing, at the gateway, an Internet Protocol (IP) connection to the LTE device.

24 Claims, 14 Drawing Sheets

(51) Int. Cl.
*H04W 4/14* (2009.01)
*H04W 76/12* (2018.01)

(58) Field of Classification Search
USPC .................. 455/456.1–457, 436–444, 432.1
See application file for complete search history.

(56) References Cited

U.S. PATENT DOCUMENTS

| | | | | |
|---|---|---|---|---|
| 2007/0281687 | A1* | 12/2007 | Jiang ................ | H04W 8/20 455/433 |
| 2010/0190497 | A1* | 7/2010 | Pudney ............. | H04W 12/08 455/435.1 |
| 2011/0195710 | A1* | 8/2011 | Nas .................. | H04W 8/18 455/432.3 |
| 2013/0005332 | A1 | 1/2013 | Sedlacek et al. | |
| 2013/0053029 | A1 | 2/2013 | Anchan | |
| 2014/0378129 | A1* | 12/2014 | Jiang ................ | H04W 60/04 455/432.1 |

FOREIGN PATENT DOCUMENTS

| | | |
|---|---|---|
| WO | WO 2011/100166 A2 | 8/2011 |
| WO | WO 2013/006805 A1 | 1/2013 |

OTHER PUBLICATIONS

"3rd Generation Partnership Project; Technical Specification Group Core Network and Terminals; 3GPP Evolved Packet System: CT WG4 Aspects (Stage3); Release 8"; 3GPP Standard; 3GPP TR 29.803, V0.9.0, XP050373102, Jun. 1, 2008.

"3rd Generation Partnership Project; Technical Specification Group Core Network and Terminals; InterWorking Function (IWF) between MAP based and Diameter based interfaces (Release 11)"; 3GPP Standard; 3GPP TS 29.305, V11.4.0, XP050691451, Dec. 21, 2012.

"3rd Generation Partnership Project; Technical Specification Group Services and System Aspects; 3GPP System Architecture Evolution (SAE); Security architecture (Release 12)"; 3GPP Standard; 3GPP TS 33.401, V12.7.0, XP050692224, Mar. 15, 2013.

"3rd Generation Partnership Project; Technical Specification Group Services and System Aspects; General Packet Radio Service (GPRS) enhancements for Evolved Universal Terrestrial Radio Access Network (E-UTRAN) access (Release 12)"; 3GPP Standard; 3GPP TS 23.401, V12.0.0, XP050691826, Mar. 5, 2013.

"3rd Generation Partnership Project; Technical Specification Group Services and System Aspects; Rationale and track of security decisions in Long Term Evolved (LTE) RAN / 3GPP System Architecture Evolution (SAE) (Release 9)"; 3GPP Standard; 3GPP TR 33.821, V9.0.0, XP050376896, Jun. 1, 2009.

Extended European Search Report of related European Patent Application No. 14775777.7 dated Nov. 15, 2016.

* cited by examiner

METHODS AND APPARATUS FOR FACILITATING LTE ROAMING BETWEEN HOME AND VISITED OPERATORS

CROSS-REFERENCE TO RELATED APPLICATIONS

The present Application for Patent is a National Stage entry of International Application No. PCT/US2014/032171, filed Mar. 28, 2014, which claims priority to U.S. Provisional Patent Application No. 61/806,703 entitled "Enabling LTE Roaming with Non-LTE HPMN" filed on Mar. 29, 2013, the content of which is hereby expressly incorporated by reference herein.

BACKGROUND

Field of the Disclosure

The present disclosure generally relates to telecommunication. More specifically, the disclosure relates to method and system for enabling and facilitating roaming of subscribers equipped with Long-Term Evolution (LTE) devices between a Visited Public Mobile Network (VPMN) and a Home Public Mobile Network (HPMN) under certain circumstances that are not supported by standards promulgated by the Third Generation Partnership Project (3GPP) or the Global Standard for Mobile Communications Association (GSMA).

Background

As telecommunication technology has progressed, numerous mobile communication standards have been developed. These standards are broadly categorized into second generation (2G), third generation (3G) and the fourth generation (4G) technologies. Examples of 2G/3G technologies include Global System for Mobile communications (GSM), General Packet Radio Service (GPRS), Enhanced Data rates for GSM Evolution (EDGE), Universal Mobile Telecommunications System (UMTS), and the like. The UMTS standard further evolved to Evolved Packet System under the Third Generation Partnership Project (3GPP). LTE commonly denominates the 3GPP Evolved Packet System (EPS) as well as its Evolved-Universal Terrestrial Radio Access. LTE technology offers a wireless broadband system with higher data rates, lower latency, and higher spectrum efficiency. The LTE technology also introduces an Evolved Core Network (EPC) which is based on new interfaces and protocols. The EPC is using Internet Protocol and Diameter as main supporting protocols, while the legacy core network rather used the SS7 or C7 signaling paradigm.

To keep up with the competition, more and more operators are adopting the newer LTE technology standard, which is reported to be the fastest adopted technology ever. These network operators provide voice and data services to their own subscribers and to subscribers from other networks. When the network operator provides service to a subscriber from a foreign country, it is referred to as "international roaming." When the network operator provides service to a subscriber from another network in the same country, it is referred to as "domestic roaming."

LTE roaming, however, remains underdeveloped. There are several issues that limit the potential capability of LTE roaming. The first one is the spectrum spread (44 3GPP defined frequency bands) but it tends to become less and less true as the chipset and device manufacturers are supporting more and more frequency bands in a LTE device. At the same time, LTE1800 is widely adopted by 43% of the commercial networks and already enables roaming in a large number of destinations. In a longer run, the Asia-Pacific Telecommunity 700 MHz (APT700) appears to be gaining momentum and may become the long-term worldwide LTE roaming frequency band.

Perhaps the greatest factors that prevent operators from entering into LTE roaming agreement are the lack of human and financial resources, the complexity required to implement LTE roaming agreements, and the lack of interest from large operators to small LTE operators. Over the last few years, the revenues to network operators have consistently declined due to increased competition and the resulting pricing pressures. On the other hand, LTE subscribers are high average revenue per user (ARPU) roamers that could provide an increase of revenues to both the home and visited operators if LTE roaming is enabled. Hence, providing LTE subscribers access to the LTE radio network has become an important priority for the network operators worldwide.

Some visited operators have an LTE access network and 2G/3G roaming agreements but no LTE roaming agreement. These visited operators would like to allow subscribers equipped with a LTE device and associated with another operator (with which the subscribers have a 2G/3G roaming agreement) to roam on the visited operator LTE network. Likewise, some home operators that have no LTE access network would like to allow their subscribers equipped with a LTE device to roam onto the LTE access network of operators with whom the home operators have an LTE roaming agreement. Additionally, some roaming hub operators have LTE roaming agreements with visited operators and 2G/3G roaming agreements with a home operator. These roaming hub operators may also seek to provide the above-mentioned use-cases as a service to the home and visited operators.

In all of these scenarios, the HPMN may wish to avoid upgrading its internal infrastructure to comply with the standard implementation (i.e., upgrade its HLRs for supporting LTE security parameters (KASME) and the Gr+ (Gr Plus) interface. Hence, there is a need in the art to have a system and method for facilitating roaming of subscribers equipped with LTE devices onto LTE-capable VPLMNs under circumstances that are not supported by the 3GPP standard or the GSMA.

SUMMARY OF THE DISCLOSURE

The present disclosure is directed to example systems, methods, and apparatuses for facilitating LTE roaming under certain circumstances that are not supported by the 3GPP standard or the GSMA. In aspect, an example method includes a Diameter S6a interface to Mobile Application Part (MAP) Gr interface interworking function for receiving Diameter messages for a subscriber in a visited network. The example method may further include transforming the Diameter into MAP messages, and vice versa. The method may further include deriving EPS authentication vectors from UMTS vectors received from HLR and deriving LTE subscription parameters from GPRS subscription parameters received from the HLR. In addition, the example method may include utilizing a GTPv2-c S8 interface interworking function for changing GTPv2-c messages into GTPv1-c for a subscriber in a visited network. In an aspect, this may include mapping GTPv2-c message parameters into GTPv1-c parameters. Furthermore, for the purposes of the present disclosure, at least these aspects of the example system and method disclosed herein may be referred to as "LTERoaming4All."

BRIEF DESCRIPTION OF DRAWINGS

In the drawings, the same or similar reference numbers identify similar elements or acts.

DETAILED DESCRIPTION OF THE FIGURES

In the following description, for purposes of explanation, specific numbers, materials and configurations are set forth in order to provide a thorough understanding of the present disclosure. It will be apparent, however, to one having ordinary skill in the art that the present disclosure may be practiced without these specific details. In some instances, well-known features may be omitted or simplified, so as not to obscure the present disclosure. Furthermore, reference in the specification to an "aspect," "one embodiment," or "an embodiment" means that a particular feature, structure or characteristic, described in connection with the disclosure, is included in at least one configuration or architecture of the present disclosure. The appearance of the phrase "in an embodiment" or "in an aspect," in various places in the specification, does not necessarily refer to the same embodiment, configuration, architecture, or arrangement.

The present disclosure provides example systems, apparatuses, and methods for facilitating LTE roaming. Aspects of the present disclosure allow a subscriber from a HPMN equipped with a LTE device to roam on a LTE capable VPMN. In an aspect, an LTERoaming4All module can be implemented in different networks to facilitate LTE roaming under certain circumstances that are not presently implemented by the 3GPP standard or the GSMA. When deployed in the VPMN, the LTERoaming4All module facilitates improved LTE roaming capability, as there is no need of LTE roaming agreement between the VPMN and the HPMN according to aspects of the present disclosure. In an additional aspect of the disclosure, existing legacy interfaces are used for interconnecting with the HPMN. Furthermore, when deployed in the VPMN, the LTERoaming4All module is configured to provide a local IP connection to the Internet. Additionally or alternatively, when deployed in a non-LTE HPMN (i.e., not having upgraded its HLR with Gr+(Gr Plus) capabilities) LTERoaming4All enables LTE roaming of HPMN subscribers equipped with LTE devices onto the VPMN LTE access network. Furthermore, when deployed in a roaming hub network, the LTERoaming4All module may be configured to realize improved roaming in the above-mentioned use-cases and enables hub solution providers to resell those implementations to HPMN and VPMN. Moreover, the operator may deploy an LTERoaming4All module in its infrastructure to implement one or more of the example solutions described in the present disclosure. This module enables efficient interworking between the LTE roaming interfaces S6a Diameter and Gr MAP, as well as between the S8 GTPv2-c interface and the Gp GTPv1-c interface.

Figure 1:
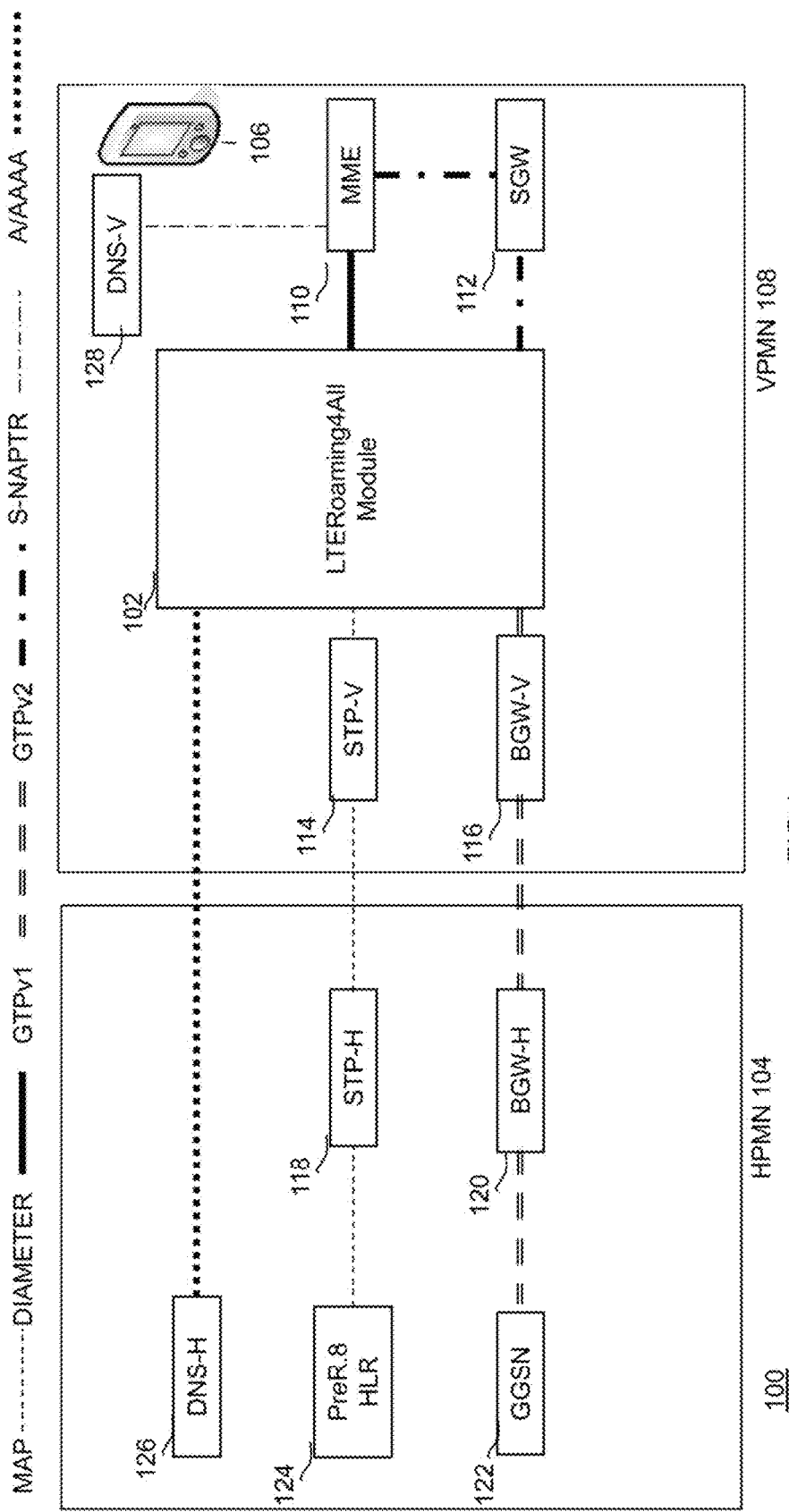
FIG. 1 illustrates a system for implementing LTERoaming4All in the VPMN, in accordance with example aspects of the present disclosure.

FIG. 1 illustrates a system 100 that implements an LTERoaming4All 102 solution in a VPMN 108, in accordance with an example aspect of the present disclosure. LTERoaming4All module 102 may be deployed in VPMN 108 to enable inbound roaming of subscribers of HPMN 104 equipped with LTE device 106, which may be compatible with VPMN 108 LTE frequency bands, and where HPMN 104 and VPMN 108 have no LTE roaming agreement. This enables a subscriber associated with HPMN 104 to register with VPMN 108 and enables VPMN 108 to authenticate the subscriber associated with HPMN 104. It also enables the subscriber to utilize an IP connection in the LTE access network with its HPMN 104 GGSN 122.

Additionally, system 100 may represent one or more network elements configured to interconnect the HPMN 104 and the VPMN 108. In an aspect, HPMN 104 may include an HLR 124 that connects to a STP-H 118 in HPMN 104 over a Signaling System 7 (SS7) link, a GGSN 122 that connects to a BGW-H 120 in HPMN 104 over an Internet Protocol (IP) network, and a DNS-H 126 that connects to LTERoaming4All module 102 in VPMN 108 over the IP network. System 100 further includes an MME 110 in VPMN 108 that connects to the LTERoaming4All module 102 over a Diameter connection, and an SGW 112 that connects to LTERoaming4All 102 module over an IP network. The MME 110 further connects to the DNS-V 128 and to the SGW 112.

LTERoaming4All module 102 connects with STP-V 114 over a Signaling System 7 (SS7) link and to BGW-V 116 over an IP network within VPMN 108. In an aspect, LTERoaming4All module 102 allows LTE roaming of subscriber of HPMN 104 into LTE access network of VPMN 108 without HPMN 104 and VPMN 108 implementing an LTE roaming agreement. It will also be apparent to a person skilled in the art that HPMN 104 and VPMN 108 may also include various other network components (not shown in FIG. 1), depending on the architecture under consideration.

Figure 2:
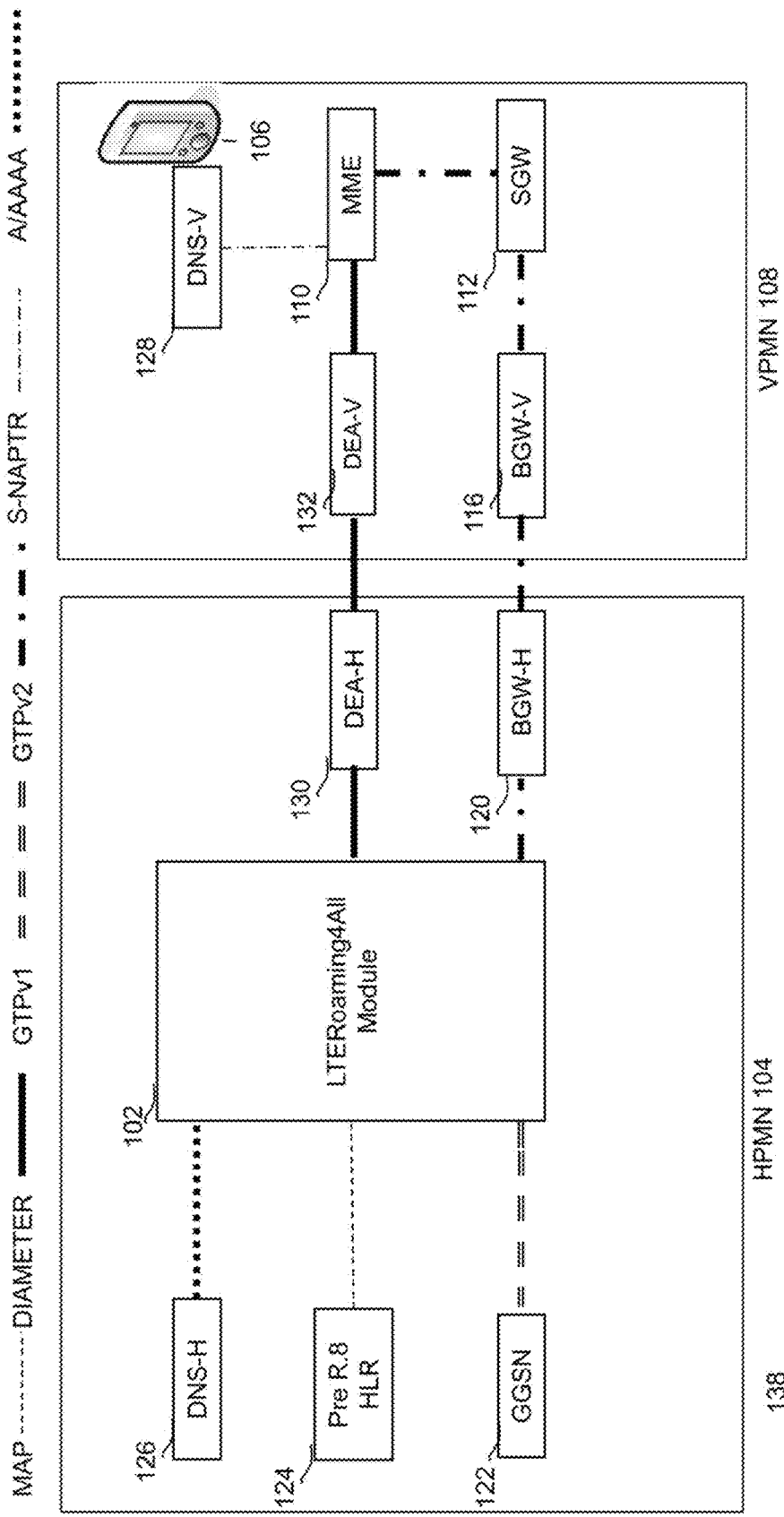
FIG. 2 illustrates a system for implementing LTERoaming4All in the HPMN, in accordance with example aspects of the present disclosure.

FIG. 2 illustrates a system 138 that implements the LTERoaming4All 102 solution in the HPMN 104, in accordance with an aspect of the present disclosure. LTERoaming4All module 102 may be deployed in HPMN 104 to enable outbound roaming of HPMN 104 subscribers in VPMN 108, for example, when the subscriber is equipped with an LTE device 106 that is compatible with VPMN 108 LTE frequency bands, and where HPMN 104 has no LTE access network or Evolved Packet Core that would enable the interworking between the HPMN 104 and the VPMN 108. This enables the subscriber from HPMN 104 to register in VPMN 108 and allows the VPMN 108 to authenticate the subscriber. It also enables the subscriber to establish and utilize an IP connection in the LTE access network with its HPMN GGSN 122.

In an aspect, system 138 represents network elements configured to interconnect the HPMN 104 and the VPMN 108. HPMN 104 includes a Home Location Register (HLR) 124 that connects over a Signaling System 7 (SS7) link to LTERoaming4All module 102, a GGSN 122 connected over IP network to LTERoaming4All module 102 and a DNS-H 126 that connects over IP network to LTERoaming4All module 102. System 138 further includes in VPMN 108 a MME 110 that connects to the DEA-V 132 over a Diameter connection, and an SGW 112 that connects to BGW-V 116 over an IP network. The MME 110 further connects to the DNS-V 128 and to SGW 112. It will also be apparent to a person skilled in the art that HPMN 104 and VPMN 108 may also include various other network components (not shown in FIG. 2), depending on the architecture under consideration. LTERoaming4All module 102 connects with DEA-H 130 over a Diameter connection and to BGW-H 120 over an IP network within HPMN 104. In an aspect, LTERoaming4All module 102 may be configured to allow LTE roaming of subscriber of non-LTE HPMN 104 into LTE access network of VPMN 108.

Figure 3:
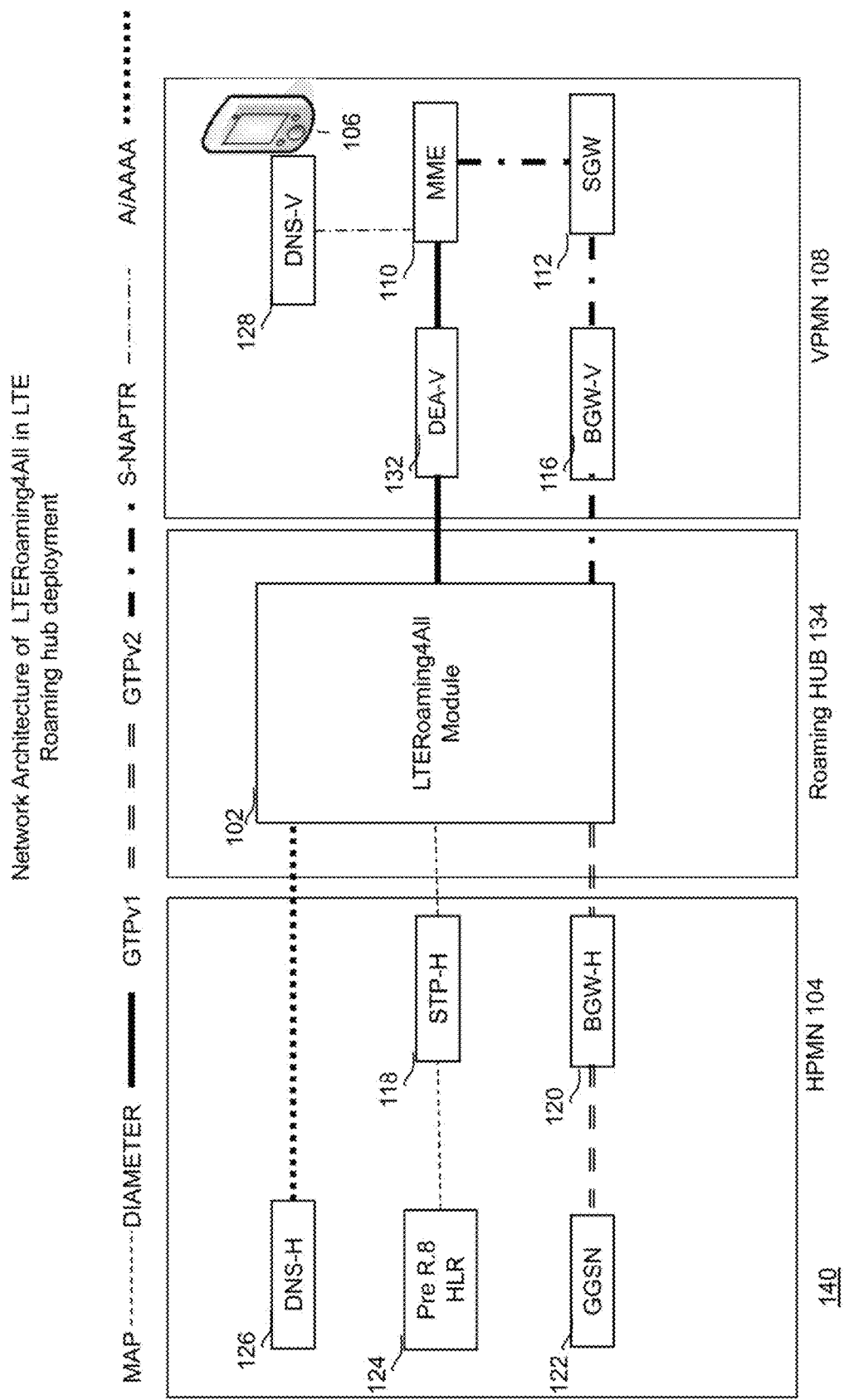
FIG. 3 illustrates a system for implementing LTERoaming4All in a roaming hub network, in accordance with example aspects of the present disclosure.

FIG. 3 illustrates a system 140 that implements the LTERoaming4All 102 solution in a roaming HUB 134 network, in accordance with an aspect of the present disclosure. LTERoaming4All module 102 is deployed in the roaming HUB 134 network to enable outbound roaming of subscribers equipped with LTE device 106, wherein the LTE device 106 is compatible with VPMN 108 LTE frequency bands. In an aspect, the subscriber and associated LTE device 106 may be relocating from HPMN 104, and HPMN 104 may have no LTE access network. In other words, LTERoaming4All module 102 may enable inbound roaming of subscribers equipped with LTE devices 106 compatible with VPMN 108 LTE frequency bands and coming from HPMN 104, wherein VPMN 108 and HPMN 104 have no LTE roaming agreement. This may enable the subscriber from HPMN 104 to register in VPMN 108 and may enable VPMN 108 to authenticate the subscriber and its associated LTE device 106. It also enables the subscriber to establish and utilize an IP connection in the LTE access network with its HPMN GGSN 122.

In addition, system 140 may represent one or more network elements configured to interconnect the HPMN 104 and the VPMN 108. HPMN 104 may include an HLR 124 that connects over a Signaling System 7 (SS7) link to STP-H 118, a GGSN 122 connected to BGW-H 120 over an IP network, and a DNS-H 126 that connects to LTERoaming4All module 102 over the IP network. In an aspect, system 140 may further include an MME 110 associated with VPMN 108 that connects to the DEA-V 132 over a Diameter connection and a SGW 112 that connects to BGW-V 116 over an IP network. The MME 110 further connects to the DNS-V 128. It will also be apparent to a person skilled in the art that HPMN 104 and VPMN 108 may also include various other network components (not shown in FIG. 3), depending on the architecture under consideration.

LTERoaming4All module 102 may connect with DEA-V 132 over a Diameter connection, and may connect to BGW-V 116 over an IP network within VPMN 108. LTERoaming4All module 102 may further connect with STP-H 118 within HPMN 104 over a Signaling System 7 (SS7) link, and may connect to BGW-H 120 within HPMN 104 over an IP network. In an aspect, LTERoaming4All module 102 may allow LTE roaming of subscriber 106 associated with non-LTE HPMN 104 into an LTE access network of VPMN 108 when the roaming agreements are managed by a roaming HUB 134 and the HUB 134 as no LTE roaming agreement with the HPMN 104.

Figure 4:
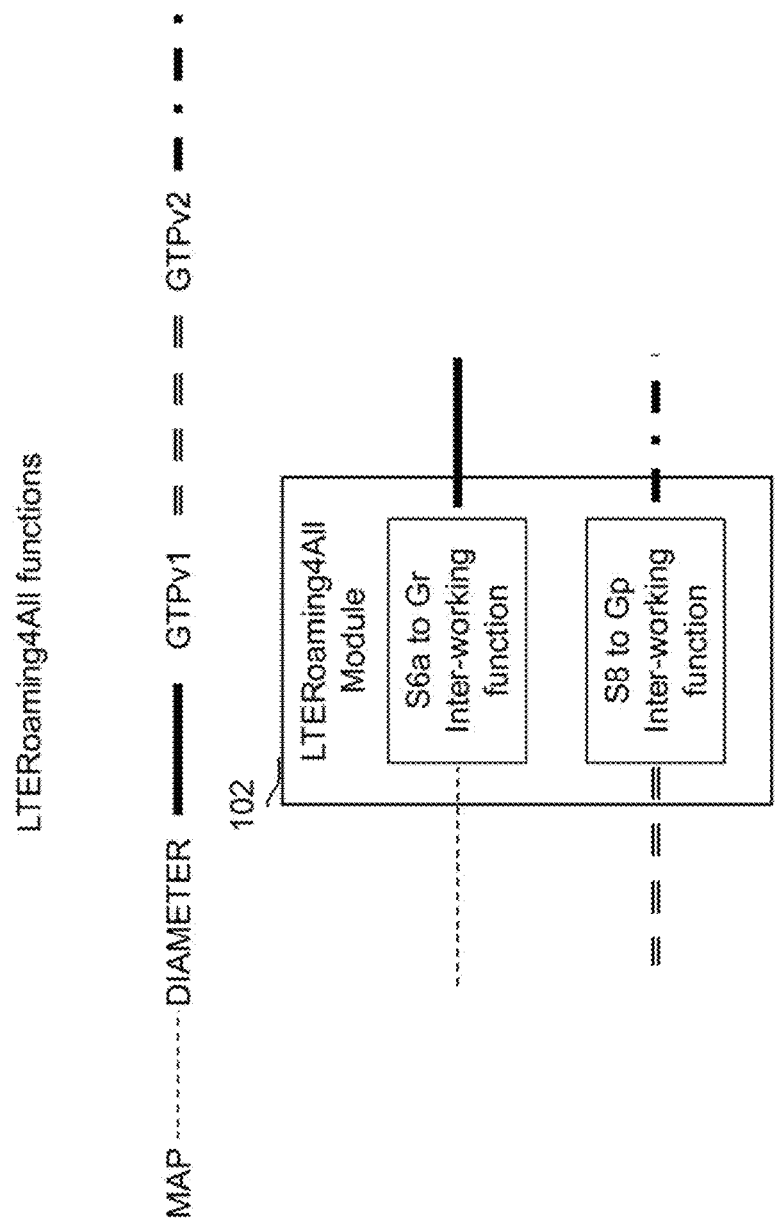
FIG. 4 illustrates how the example system of the present disclosure may be further decomposed into two interworking functions.

FIG. 4 illustrates how LTERoaming4All module 102 can be further configured to execute two unique and interworking functions. One such function may manage the interworking between the Diameter S6a interface and the MAP Gr interface, in accordance with an aspect of the present disclosure. The second function may manage the interworking between the GTPv2-c S8 interface and the GTPv1-c Gp one, in accordance with an aspect of the present disclosure.

Figure 5:
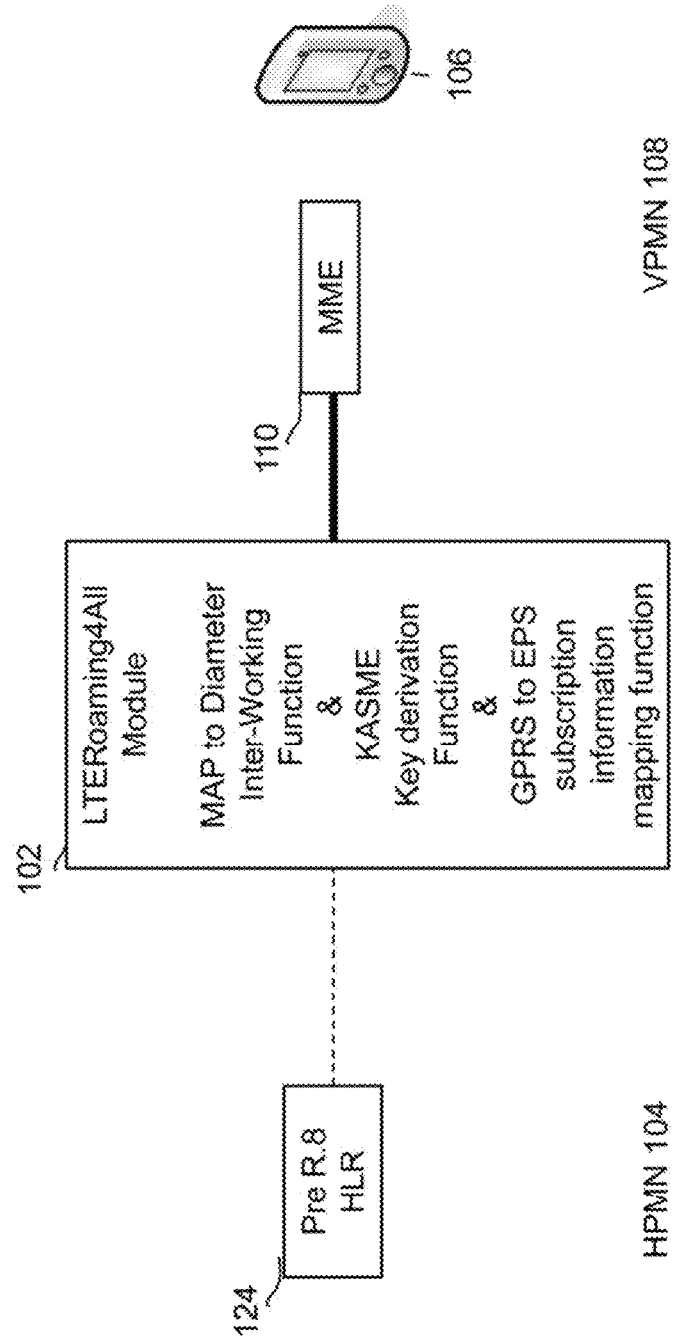
FIG. 5 illustrates a system for interworking between the Diameter S6a and the MAP Gr interfaces, in accordance with example aspects of the present disclosure.

FIG. 5 illustrates a sub-system component of the LTERoaming4All module 102 that performs the interworking between the Diameter S6a interface and the MAP Gr interface, in accordance with an aspect of the present disclosure. The sub-system component may be configured to implement three functions to enhance the scenario 1 described in 3GPP TS 29.305 such that the pre-3GPP Release 8 HLR 124 must not be upgraded to support Rel-8 EPS security and to transfer of Rel-8 security parameters. In an aspect, the three functions may comprise the MAP to Diameter interworking function, a Key Derivation Function, and a GPRS to EPS subscription mapping function.

Figure 6:
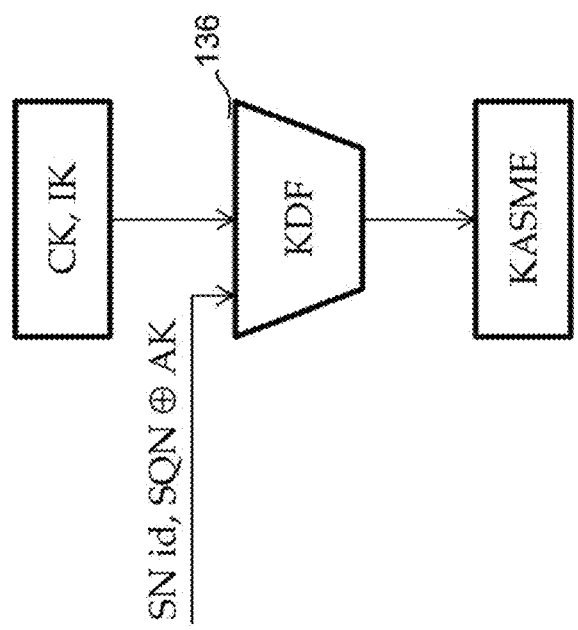
FIG. 6 illustrates a Key Derivation Function implemented in LTERoaming4All, in accordance with example aspects of the present disclosure.
Figure 7:
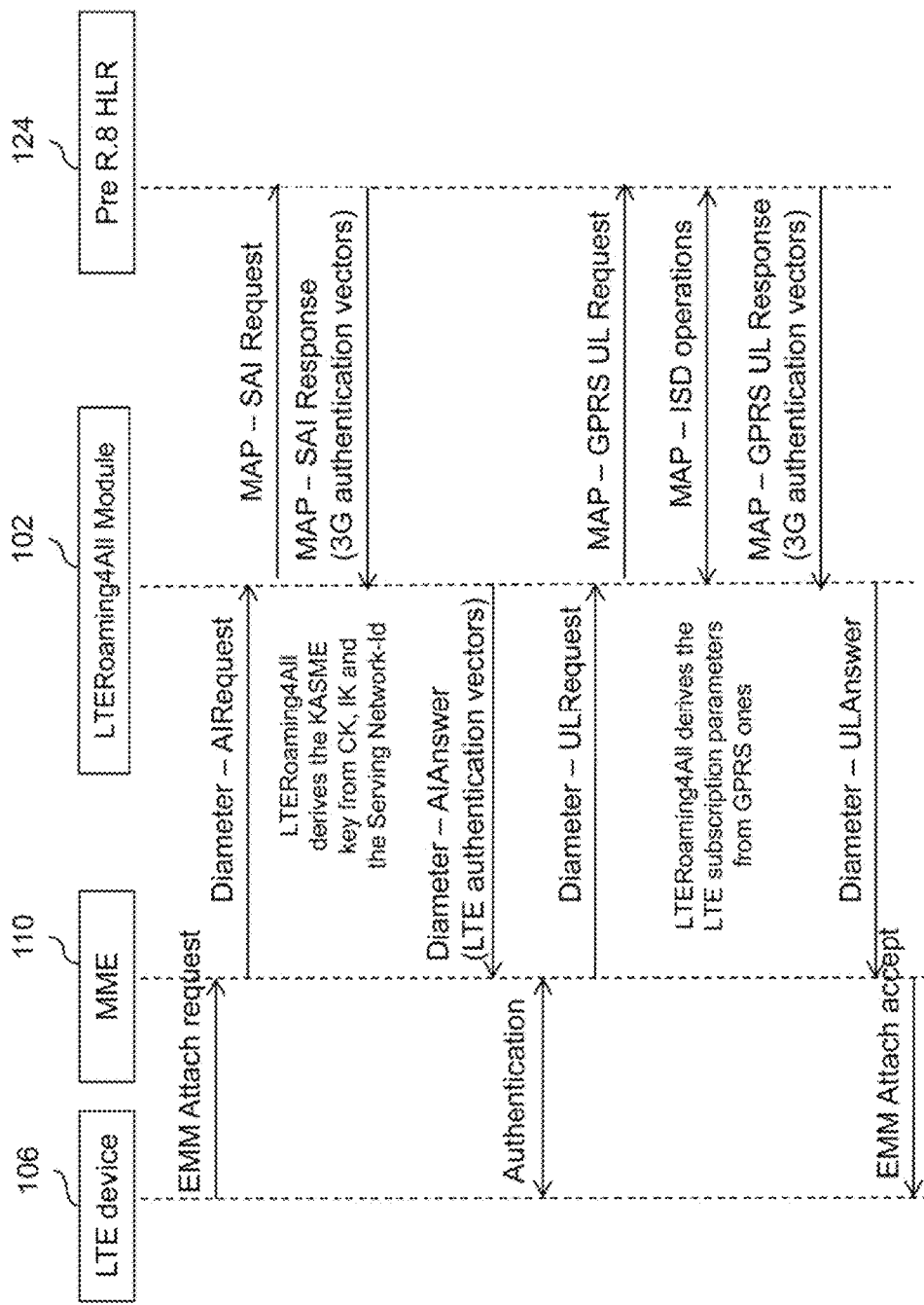
FIG. 7 represents a flow diagram of an EPS ATTACH procedure in accordance with example aspects of the present disclosure.

FIG. 6 illustrates the standard Key Derivation Function as defined in TS 33.401, which may implemented in LTERoaming4All 102 solution. Furthermore, FIG. 7 represents a flow diagram illustrating the Evolved Mobility Management ATTACH procedure between the subscriber's LTE device 106, the MME 110, and the HLR 124, in accordance with an example aspect of the present disclosure. The subscriber's LTE device 106 may send an ATTACH request to the MME 108. The MME 110 may send a Diameter AuthenticationInformationRequest message to the LTERoaming4All module 102. Furthermore, the LTERoaming4All module 102 may change the Diameter Authentication Information Request into a MAP Send-Authentication-Information-Request, and may route the MAP Send-Authentication-Information-Request onward to the HLR 124. The HLR 124 may send a MAP Send-Authentication-Information-Response back to the LTERoaming4All module 102 with the 3G authentication vectors (RAND, Expected User Response (XRES), CK, IK, Authentication Token (AUTN)). The LTERoaming4All module 102 may derive the KASME from the received confidentiality key (CK), integrity key (IK), and the ServingNetworkId. The LTERoaming4All module 102 may be configured to transform the MAP Send-Authentication-Information-Response into a Diameter AuthenticationInformationResponse, replace the 3G authentication vectors by EPS vectors (RAND, XRES, KASME, AUTN), and send back the Diameter AuthenticationInformationResponse to the MME 110. The MME 110 may then authenticate the subscriber. The MME 110 may continue the ATTACH procedure by sending a Diameter UpdateLocationRequest message to the LTERoaming4All module 102. The LTERoaming4All module 102 may change the Diameter UpdateLocationRequest into a MAP Update-GPRS-Location-Request and may route the MAP Update-GPRS-Location-Request onward to the HLR 124. Furthermore, several MAP InsertSubscriberInformation requests and responses may be exchanged between the LTERoaming4All module 102 and the HLR 124, and may carry some or all of the GPRS subscription information. Once the exchange is completed, the HLR 124 may send back a MAP Update-GPRS-Location-Response message to the LTERoaming4All module 102. LTERoaming4All module 102 may transform the MAP Update-GPRS-Location-Response message into a Diameter Update-Location-Answer message, may replace the GPRS subscription information by EPS subscription information, and/or may route the message back to the MME 110. Additionally, the MME 110 may complete the ATTACH procedure by sending an Evolved Mobility Management ATTACH accept message to the subscriber's LTE device 106. In addition, for simplicity of the present disclosure, the session creation procedure is not shown in FIG. 7, but is detailed in reference to FIG. 9, below.

Figure 8:
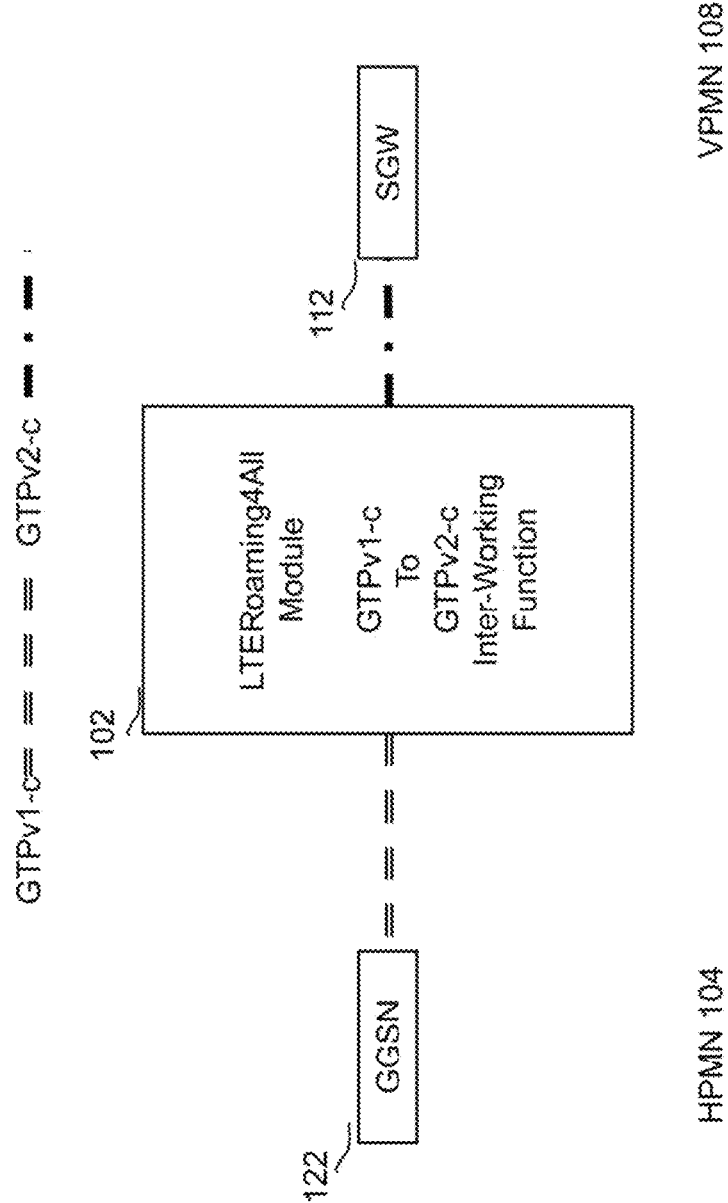
FIG. 8 illustrates an interworking system between GTPv1-c Gp and GTPv2-c S8 interfaces, in accordance with example aspects of the present disclosure.
Figure 9:
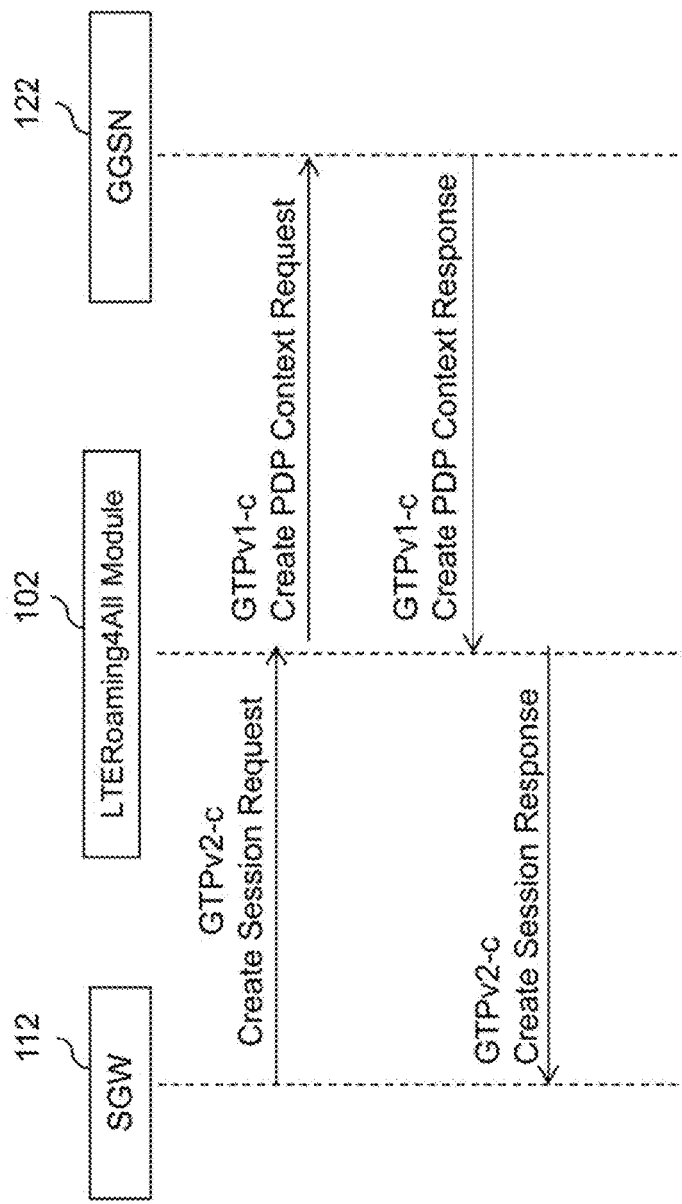
FIG. 9 represents a flow diagram for creating a GPRS Tunneling Protocol (GTP) tunnel between a Serving Gateway (SGW) and a Gateway GPRS Support Node (GGSN), in accordance with example aspects of the present disclosure.

FIG. 8 illustrates a sub-system component of the LTERoaming4All 102 that may be configured to perform the interworking between the GTPv2-c S8 interface and the GTPv1-c Gp one, in accordance with an aspect of the present disclosure. In addition, FIG. 9 represents a flow diagram illustrating the creation of a GTP tunnel between the SGW 112 and the GGSN 122 by LTERoaming4All module 102, in accordance with an aspect of the present disclosure. The flow diagram of FIG. 9 does not explicitly depict the exchange between the MME 110 and the SGW 112 or the exchange between the MME 110 and the LTE device 106, as these exchanges are performed in accordance with the standard and the LTERoaming4All module 102 is not involved at that particular stage. These exchanges, however, are contemplated by the present disclosure.

As depicted in FIG. 9, the SGW 112 may initiate GTP tunnel creation by sending a Create Session Request GTPv2-c message to LTERoaming4All module 102. LTERoaming4All module 102 may change the Create Session Request GTPv2-c message into a Create PDP Context Request GTPv1-c message and may send the Create PDP Context Request GTPv1-c message to the GGSN 122. Thereafter, the GGSN 122 may accept the GTP tunnel creation and may send a Create PDP Context Response GTPv1-c message back to LTERoaming4All 102. LTERoaming4All module 102 may then change the Create PDP Context Response GTPv1-c message into a Create Session Response GTPv2-c message and may send the Create Session Response GTPv2-c message back to the SGW 112. By this process, the GTP tunnel may be established and may allow user plan traffic to flow between the SGW 112 and the GGSN 122.

Figure 10:
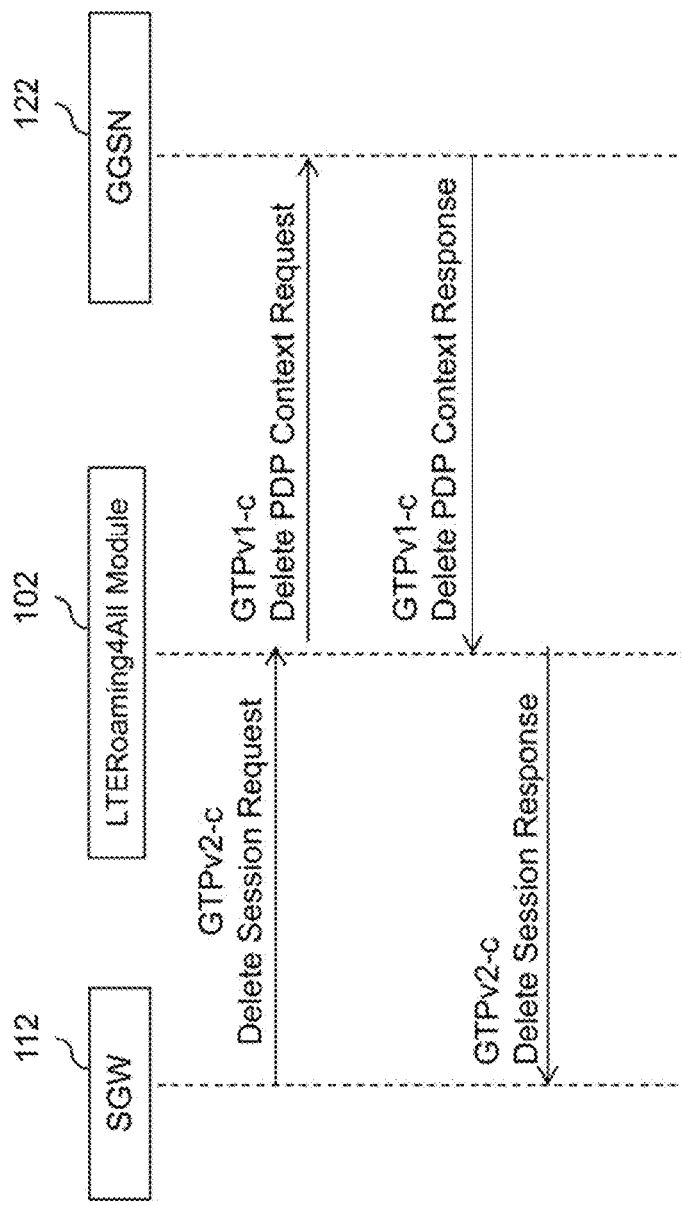
FIG. 10 represents a flow diagram for deleting a GTP tunnel between a SGW and a GGSN, in accordance with example aspects of the present disclosure.

FIG. 10 illustrates a flow diagram illustrating how deletion of a GTP tunnel between the SGW 112 and the GGSN 122 is enabled by LTERoaming4All module 102, in accordance with an example aspect of the present disclosure. The flow diagram does not explicitly depict the exchange between the MME 110 and the SGW 112 or the exchange between the MME 110 and the LTE device 106, as these exchanges are performed in accordance with the standard and as LTERoaming4All module 102 is not involved at this stage. Such exchanges, however, are contemplated by the present disclosure.

In an aspect, the SGW 112 may initiate deletion of the GTP tunnel by sending a Delete Session Request GTPv2-c message to LTERoaming4All module 102. LTERoaming4All module 102 may change the Delete Session Request GTPv2-c message into a Delete PDP Context Request GTPv1-c message and may send the Delete PDP Context Request GTPv1-c message to the GGSN 122. Thereafter, the GGSN 122 may accept the GTP tunnel deletion and may send a Delete PDP Context Response GTPv1-c message back to LTERoaming4All module 102. LTERoaming4All module 102 may change the Delete PDP Context Response GTPv1-c message into a Delete Session Response GTPv2-c message and may sends the Delete Session Response GTPv2-c message back to the SGW 112. Accordingly, the GTP tunnel may be deleted.

Figure 11:
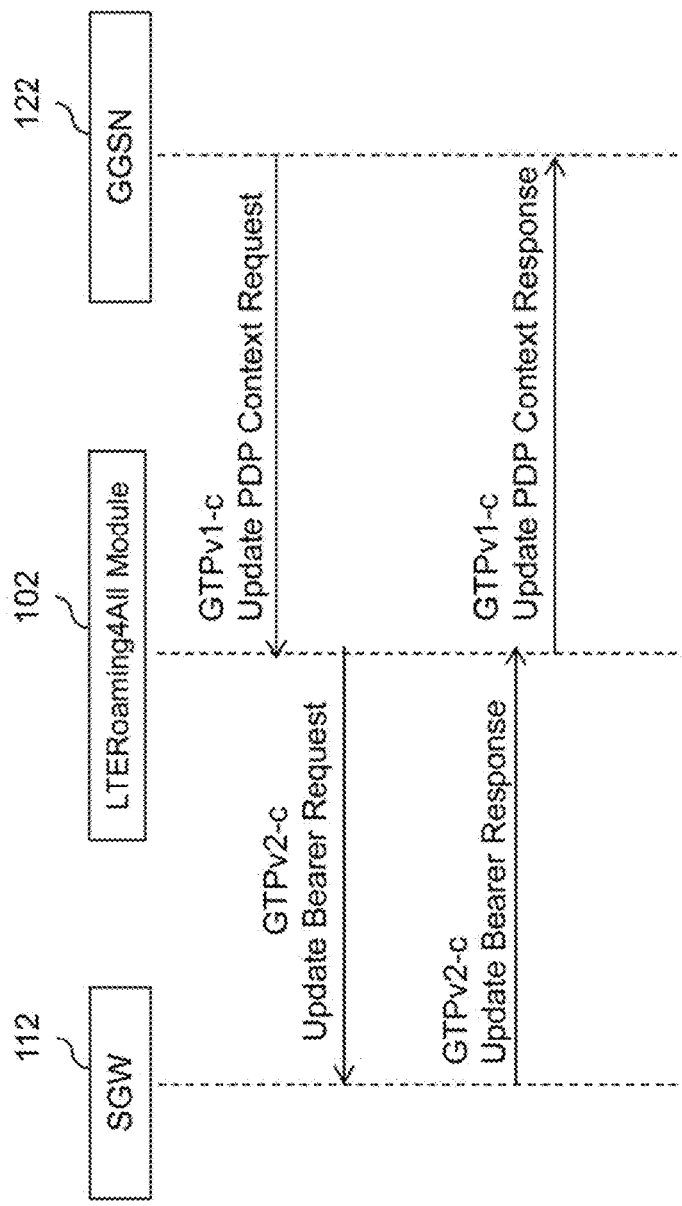
FIG. 11 represents a flow diagram for updating a GTP tunnel between a GGSN and a SGW, in accordance with example aspects of the present disclosure.

FIG. 11 represents a flow diagram illustrating how a GTP tunnel modification between the GGSN 122 and the SGW 112 may be enabled by LTERoaming4All module 102 in accordance with an aspect of the present disclosure. The GGSN 122 may initiate the GTP tunnel modification by sending an Update PDP Context Request GTPv1-c message to LTERoaming4All module 102. LTERoaming4All module 102 may change the Update PDP Context Request GTPv1-c message into an Update Bearer Request GTPv2-c message and may send the Update Bearer Request GTPv2-c message to the SGW 112. The flow diagram does not explicitly show the exchange between the SGW 112 and the MME 110 or the exchange between the MME 110 and the LTE device 106, as these exchanges are performed in accordance with the standard and as the LTERoaming4All module 102 is not involved at this stage. These exchanges, however, are fully contemplated by the present disclosure. Furthermore, the SGSW may accept the GTP tunnel modification and may send an Update Bearer Response GTPv2-c message back to LTERoaming4All module 102. Thereafter, LTERoaming4All module 102 may change the Update Bearer Response GTPv2-c message into an Update PDP Context Response GTPv1-c message and may send the Update PDP Context Response GTPv1-c message back to the GGSN 122. Accordingly, the GTP tunnel may be modified.

Figure 12:
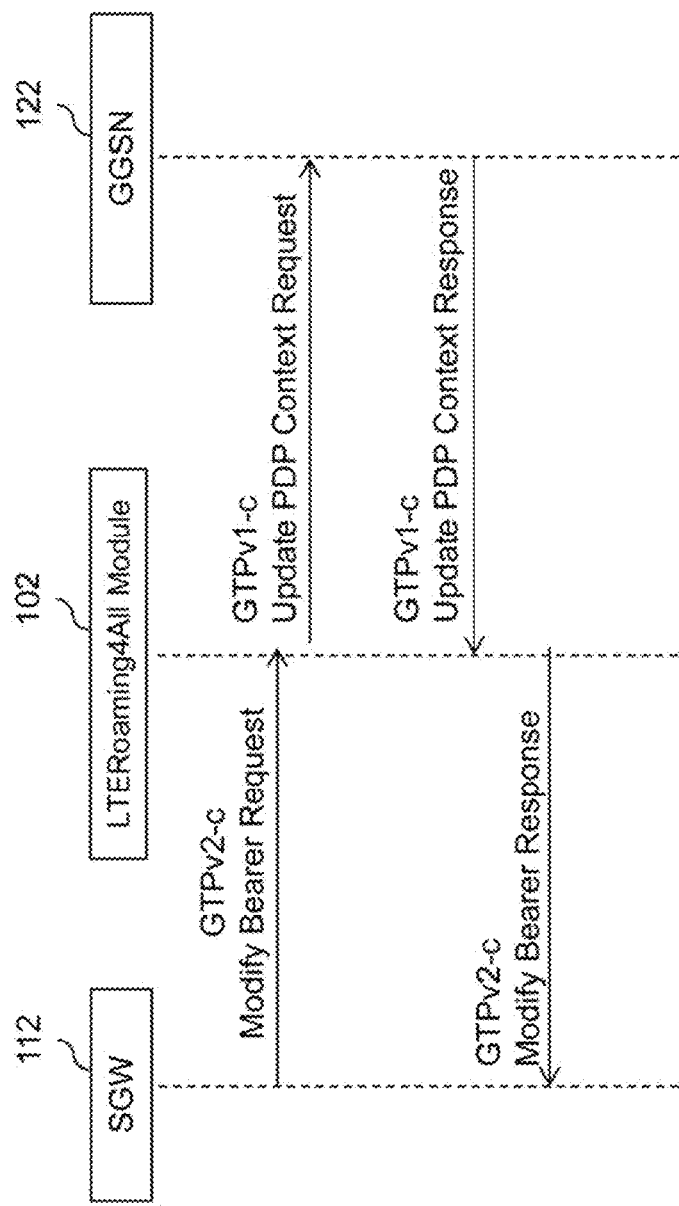
FIG. 12 represents a flow diagram for updating a GTP tunnel between a SGW and a GGSN, in accordance with example aspects of the present disclosure.

FIG. 12 represents a flow diagram illustrating how a GTP tunnel modification at an inter-RAT change from 2G/3G to LTE between the SGW 112 and the MME 110 is enabled by LTERoaming4All module 102, in accordance with an aspect of the present disclosure. For example, the SGW 112 may initiate the GTP tunnel modification by sending a Modify Bearer Request GTPv2-c message to LTERoaming4All module 102. LTERoaming4All module 102 may change the Modify Bearer Request GTPv2-c message into an Update PDP Context Request GTPv1-c message and may send the Update PDP Context Request GTPv1-c message back to the SGW 112. The flow diagram of FIG. 12 does not explicitly depict the exchange between the SGW 112 and the MME 110 or the exchange between the MME 110 and the LTE device 106, as these exchanges are performed in accordance with the standard, and LTERoaming4All module 102 is not involved at this stage. These exchanges, however, are contemplated by the present disclosure.

Furthermore, the GGSN 122 may accept the GTP tunnel modification and may send an Update PDP Context Response GTPv1-c message back to LTERoaming4All module 102. LTERoaming4All module 102 may change the Update PDP Context Response GTPv1-c message into a Modify Bearer Response GTPv2-c message and may send the Modify Bearer Response GTPv2-c message back to the SGW 112. Accordingly, the GTP tunnel is modified.

Figure 13:
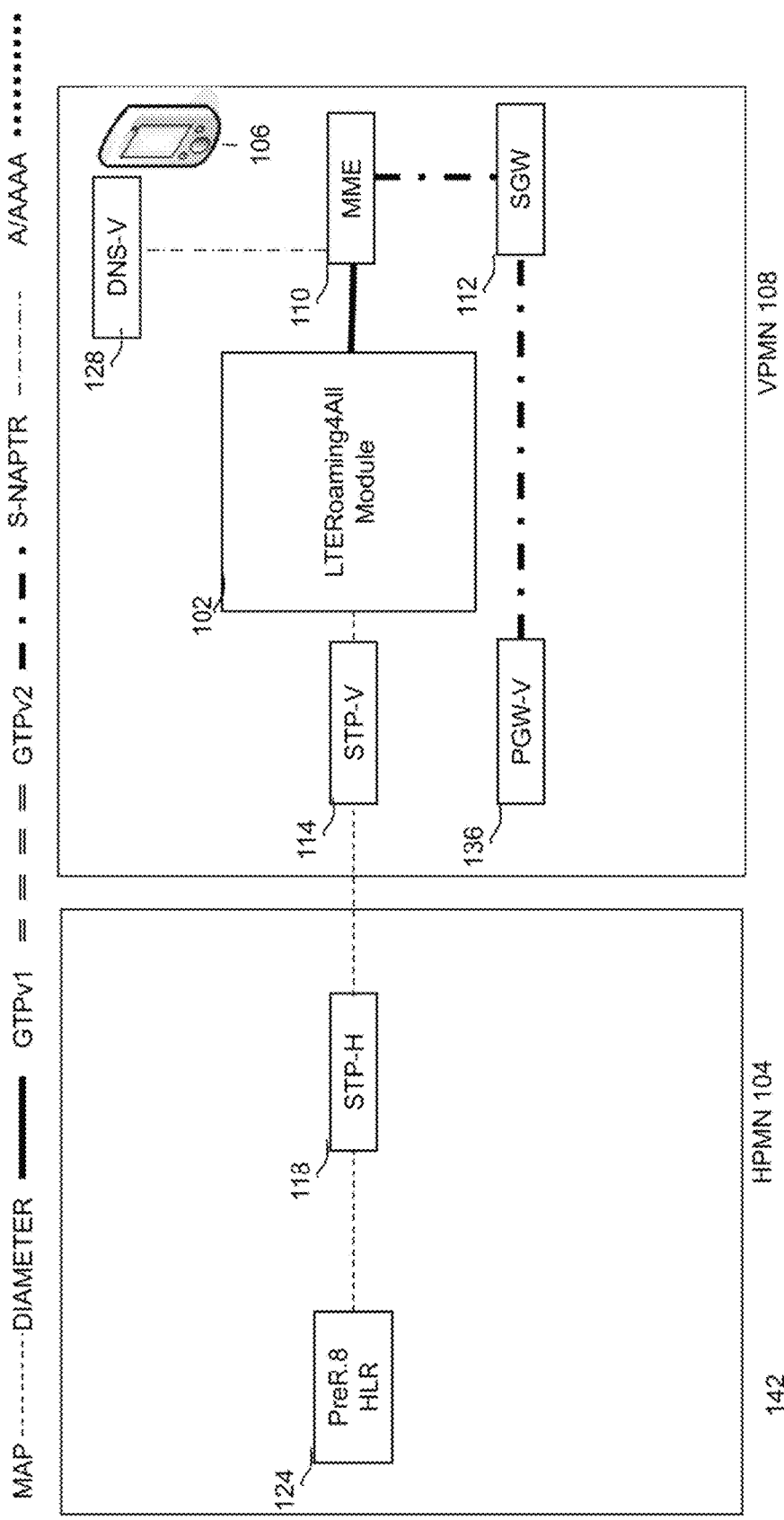
FIG. 13 illustrates a system for implementing a Local Break Out IP connection of the subscriber of HPMN to the local IP network in the VPMN, in accordance with example aspects of the present disclosure.

FIG. 13 illustrates a system 142 that may be configured to implement the LTERoaming4All solution in the VPMN 108, in accordance with an aspect of the present disclosure. LTERoaming4All module 102 may be deployed in VPMN 108 and may be configured to enable inbound roaming of subscribers of HPMN 104 equipped with an LTE device 106, wherein the LTE device 106 is compatible with VPMN 108 LTE frequency bands and wherein HPMN 104 and VPMN 108 have no LTE roaming agreement. This enables the subscriber of HPMN 104 to register in VPMN 108 and to authenticate the subscriber LTE device 106. It also enables the subscriber LTE device 106 to initiate and utilize a local IP connection in the LTE access network with a PGW in the VPMN 108 to connect the LTE device 106 the Internet. Furthermore, system 142 may represent one or more network elements configured to interconnect the HPMN 104 and the VPMN 108. In an aspect, HPMN 104 includes an HLR 124 that connects to a STP-H 118 in HPMN 104 over a Signaling System 7 (SS7) link.

System 142 may further include a MME 110 in VPMN 108 that may connect to the LTERoaming4All module 102 module over a Diameter connection and an SGW 112 that connects to a PGW-V 136. In an additional aspect, the MME 110 further connects to the DNS-V 128 and to the SGW 112. It will also be apparent to a person skilled in the art that HPMN 104 and VPMN 108 may also include various other network components (not shown in FIG. 13), depending on the architecture under consideration.

In an aspect, LTERoaming module 102 may connect with STP-V 114 over a Signaling System 7 (SS7) link. Furthermore, LTERoaming4All module 102 may be configured to allow LTE roaming of subscriber of HPMN 104 into LTE access network of VPMN 108 without the implementation of an LTE roaming agreement and to provide a local IP connection.

Figure 14:
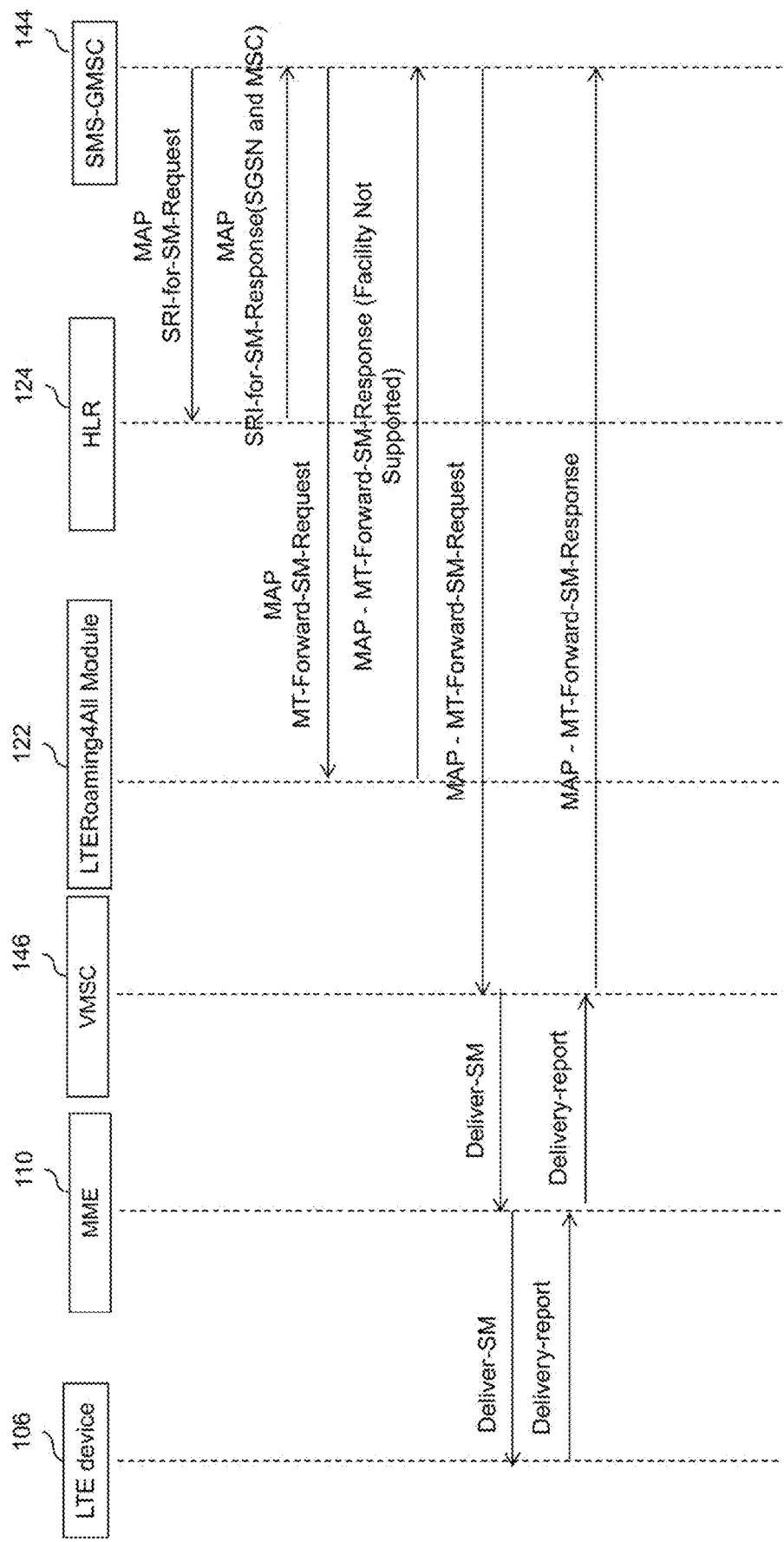
FIG. 14 represents a flow diagram illustrating how a mobile-terminating short message may be delivered to Circuit Switched Fallback LTE device.

FIG. 14 represents a flow diagram illustrating how a mobile-terminating short message (SMS-MT) (e.g., communicated according to a Short Message Service (SMS)), such as a Mobile Application Part-Mobile Terminating-Forward-Short Message (MAP-MT-Forward-SM), may be delivered to Circuit Switched Fallback (CSFB) LTE device 106. In an aspect, an SMS-GMSC 144 may initially attempt delivery of the short message in the packet switched (PS) domain where the MME does not support the Diameter SGd interface with the Short Message Service Center (SMSC) defined in 3GPP Release 11. The SMS-GMSC 144 may query the HLR 124 to retrieve the location of the subscribers by sending a MAP Send-Routing-Information-for-SM-Request. The HLR 124 may send a Send-Routing-Information-for-SM-Response back to the SMS-GMSC 144 with the Serving GRPS Support Node (SGSN) and the Mobile Switching Center (MSC) addresses. In an additional aspect, the SGSN address in the Send-Routing-Information-for-SM-Response may be associated with the LTRoaming4All module 122. In addition, the SM-GSMC 144 may attempt first delivery of the SMS-MT in the PS domain, as the SM-GSMC 144 is configured to do so. Furthermore, the LTERoaming4All module 122 may receive the MAP MT-Forward-SM-Request message and may return a reject message with an error code of "facility not supported." Thereafter, the SMS-GMSC 144 may retry delivery in the circuit-switched (CS) domain and may send a MAP MT-Forward-SM-Request to the Visited Mobile Switching Center (VMSC) 146. The VMSC 146 may further relay the Deliver-SM that was encapsulated in the MAP MT-Forward-SM-Request to the MME 110 over the SGs interface, and the MME 110 may deliver the Deliver-SM to the subscriber LTE device 106. Upon receipt if the Deliver-SM, the subscriber LTE device 106 may acknowledge successful delivery of the message in the delivery-report, which may be sent back to the SMS-GMSC 144 through the MME 110 and VMSC 146.

The LTERoaming4All solution contemplated by the present disclosure enables LTE roaming of subscribers equipped with LTE devices onto LTE-capable VPLMNs under circumstances that are not presently supported by the 3GPP standards and/or by the GSMA. In an embodiment of the present disclosure, the LTERoaming4All solution described herein may be deployed in the VPMN and may allow inbound roaming of subscribers associated with an HPMN equipped with LTE devices that are compatible with VPMN LTE frequency bands, and may be implemented where HPMN and VPMN have no LTE roaming agreement. In an additional aspect of the present disclosure, the LTERoaming4All solution may be deployed in HPMN to enable outbound roaming of subscribers of HPMN equipped with LTE devices that are compatible with VPMN LTE frequency bands, and where the subscriber LTE devices are associated with an HPMN that has no LTE access network, and, therefore, no 3GPP Release 8 HLR or PGW. In another example aspect of the present disclosure, the LTERoaming4All solution may be deployed in the roaming HUB network to enable outbound roaming of subscribers equipped with LTE devices that are compatible with VPMN LTE frequency bands, and where the subscriber LTE devices are associated with and/or originate from an HPMN that has no LTE access network. The LTERoaming4All may additionally or alternatively enable inbound roaming of subscribers equipped with LTE devices that are compatible with VPMN LTE frequency bands and originate from (or are otherwise associated with) an HPMN that has no LTE roaming agreement with the VPMN. It should be obvious for a person skilled in the art that other example arrangements, configurations, advantages, methodologies, and architectures are possible.

Furthermore, in some or all of the example embodiments, configurations, methods, systems, or apparatuses of the present disclosure, one or two of the interworking functions listed in FIG. 4 are deployed. These interworking functions may include:

1. An interworking function between Diameter S6a and MAP Gr interfaces; and
2. An interworking function between GTPv2-c S8 and GTPv1-c Gp interfaces Furthermore, for purposes of the present disclosure, implementations of LTERoaming4All involving (for example, using S6a and Gr interfaces) are not exclusive to roaming situations. Instead, the same or similar functionality may be extended to non-roaming implementations. In addition, the interworking function between GTPv2-c S8 and GTPv1-c Gp interfaces described herein may likewise be implemented across non-roaming S5 and Gn interfaces.

The interworking function between Diameter S6a and MAP Gr interfaces allows authentication, mobility and subscription management between a MME and a pre-Release 8 (Rel-8) HLR, where the pre-Rel-8 HLR does not support Rel-8 EPS security or transfer of Rel-8 security parameters. This scenario is not defined in the 3GPP standard TS 29.305. The interworking function between Diameter S6a and MAP Gr interfaces performs the interworking between Diameter and MAP protocols according to the 3GPP standard TS 29.305 except that it derives and replaces the UMTS authentication vectors by Evolved Packet System (EPS) authentication vectors and derives and replaces the GPRS subscription information by EPS subscription information.

In addition, currently, if an MME does not support the SGd interface with the SMSC introduced in 3GPP Release 11, a MAP MT-Forward-SM-Request message cannot be reformatted as a corresponding Diameter message. Thus, when the LTERoaming4All module 102 receives a MAP MT-Forward-SM-Request for a subscriber device roaming in a VPMN where MMEs do not support SGd, the LTERoaming4All module 102 may be configured to reject the Short Message delivery by sending a MAP MT-Forward-SM-Response message with a configurable user error including but not limited to "facility not supported" to force the SMSC, the SMS-Router, or the IP Short Message Gateway (IP-SM-GW) to retry SMS delivery across the CS domain or IP Multimedia Subsystem (IMS) domain.

In addition, the interworking function between the Diameter S6a and MAP Gr interfaces may include a Key Derivation Function that may be utilized to compute the KASME key from CK, IK, and Serving Network ID (SN ID) that may be used to replace the CK and IK in an EPS authentication vector set. When deriving a KASME from CK, IK, and SN ID for producing authentication vectors, the following parameters may be used to form the input S to the Key Derivation Function:

FC=0x10,
P0=SN id,
L0=length of SN id (i.e. 0x00 0x03),
P1=SQN⊕AK
L1=length of SQN⊕AK (i.e. 0x00 0x06)
S=0x10||SN id||0x03||SQN⊕AK||0x06

The "exclusive or" (XOR) of the Sequence Number (SQN) and the Anonymity Key (AK) is sent to the UE as a part of the Authentication Token (AUTN), and may be represented as $\overline{SQN \oplus AK}$. In an aspect, $\overline{SQN \oplus AK}$ may extracted from AUTN received in the authentication quintet (RAND, XRES, CK, IK, AUTN) as AUTN is the concatenation of $\overline{SQN \oplus AK}$, Authentication Management Field (AMF), and Message Authentication Code (MAC).

The SN ID may consist of Mobile Country Code (MCC) and Mobile Network Code (MNC) of the Visited-PLMN-Id Attribute Value Pair (AVP) received in the Authentication-Information-Request, and may be encoded as an octet string according to the following table:

| 8 | 7 | 6 | 5 | 4 | 3 | 2 | 1 | |
|---|---|---|---|---|---|---|---|---|
| MCC digit 2 | | | | MCC digit 1 | | | | octet 1 |
| MNC digit 3 | | | | MCC digit 3 | | | | octet 2 |
| MNC digit 2 | | | | MNC digit 1 | | | | octet 3 |

In an additional aspect, the input key may be equal to the concatenation of CK and IK (CK||IK), each of which may be received in the authentication quintet (RAND, XRES, CK, IK, AUTN). KASME may be derived according to the below formula:

KASME=HMAC-SHA-256(*CK*||*IK*,0x10||*SN id*||0x03||*SQN⊕AK*||0x06)

In addition, the interworking function between the Diameter S6a and MAP Gr interfaces may include a function to modify or replace the received GPRS subscription information into EPS subscription information. In a further aspect of the present disclosure, the entire GPRS subscription information may be replaced by an EPS subscription profile configured in the LTERoaming4All module. In yet another aspect of the present disclosure, the EPS subscription information may be mapped from the GPRS subscription information.

In a further aspect of the present disclosure, LTERoaming4All module 102 may be configured to map Quality-of-Service (QoS) information (QCI) associated with one or more communication sessions between networks or systems. In an aspect, QCI may be derived according to the table below:

| QCI | Traffic Class | Traffic Handling Priority | Signalling Indication | Source Statistics Descriptor |
|---|---|---|---|---|
| 7 | Conversational | N/A | N/A | Speech |
| 7 | Conversational | N/A | N/A | Unknown |
| 7 | Conversational | N/A | N/A | Unknown |
| 6 | Streaming | N/A | N/A | Unknown |
| 5 | Interactive | 1 | Yes | N/A |
| 6 | Interactive | 1 | No | N/A |
| 7 | Interactive | 2 | No | N/A |
| 8 | Interactive | 3 | No | N/A |
| 9 | Background | N/A | N/A | N/A |

In an aspect, Max-Requested-Bandwidth-UL and Max-Requested-Bandwidth-DL may be mapped one-to-one to/from the pre-Rel-8 bearer parameters Maximum Guaranteed Bit Rate (MBR) of the Packet Data Protocol (PDP) context associated with traffic classes "conversational" or "streaming." Otherwise, Max-Requested-Bandwidth-UL and Max-Requested-Bandwidth-DL may be configured independently in the LTERoaming4All module 102.

Furthermore, in an aspect, the Allocation and Retention Priority parameter may be derived according to the table below:

| Pre-Rel-8 ARP Value | EPS Bearer ARP Priority Value |
|---|---|
| 1 | 1 |
| 2 | H + 1 |
| 3 | M + 1 |

Although the priority and ARP fields are not present above, these values may be configured by LTERoaming4All module 102 (e.g., priority values may include H (high priority) and/or M (medium priority)).

The interworking function between GTPv2-c S8 and GTPv1-c interfaces allows creating and managing a GTP tunnel between a SGW and a GGSN. However, a one-to-one mapping between GTPv2-c messages and GTPv1-c message is not always feasible. To remedy this deficiency of prior solutions, the LTERoaming4All module 102 may generate one or more GTPv2-c messages and may transmit the one or more GTPv2-c messages to the SGW if those messages have no equivalent in GTPv1-c and if the messages are required to manage the GTP tunnel with the SGW. In an additional aspect, the LTERoaming4All module 102 may further generate GTPv1-c messages and transmit the GTPv1-c messages to the GGSN if those messages have no equivalent in GTPv2-c and if the messages are required to manage the GTP tunnel with the GGSN. Thus, the below tables provides the mapping of GTPv1-c messages into GTPv2-c messages in an embodiment of the present disclosure.

| GTPv2-c message | GTPv1-c message |
| --- | --- |
| Create Session Request | Create PDP Context Request |
| Create Session Response | Create PDP Context Response |
| Delete Session Request | Delete PDP Context Request |
| Delete Session Response | Delete PDP Context Response |
| Update Bearer Request | Update PDP Context Request |
| Update Bearer Response | Update PDP Context Response |
| Create Bearer Request | Initiate PDP Context Activation Request |
| Create Bearer Response | Initiate PDP Context Activation Response |
| Delete Bearer Request | Delete Sec PDP Context Request |
| Delete Bearer Response | Delete Sec PDP Context Response |
| Modify Bearer Command | Update PDP Context Request |
| Modify Bearer Request | Update PDP Context Request |
| Modify Bearer Response | Update PDP Context Response |
| Bearer Resource Command | Update PDP Context Request Or Delete Sec PDP Context Request |

Furthermore, the table below provides an example mapping between GTPv1-c parameters and GTPv2 parameters in an aspect of the present disclosure:

| LTE Information Elements(TLIV) | LTE IE Type | 3G Information Elements(TV, TLV) | 3G IE Type | TLV/TV |
| --- | --- | --- | --- | --- |
| IMSI | 1 | IMSI | 2 | TV |
| MSISDN | 76 | MSISDN | 134 | TLV |
| MEI | 75 | IMEI | 151 | TLV |
| ULI | 86 | ULI | 152 | TLV |
| Serving Network | 83 | RAI | 3 | TV |
| RAT Type | 82 | RAT Type | 151 | TLV |
| Cause | 2 | Cause | 1 | TV |
| FTEID | 87 | TEID + GSN Address | 16/17 133 | TV TLV |
| APN | 71 | APN | 131 | TLV |
| Selection Mode | 128 | Selection Mode | 15 | TV |
| PDN Type | 99 | | | |
| PDN Address(PAA) | 79 | End User Address | 128 | TLV |
| EBI/LBI | 73 | NSAPI | 20 | TV |
| APN Restriction | 127 | APN Restriction | 149 | TLV |
| APN-AMBR | 72 | APN-AMBR | 198 | TLV |
| PCO | 78 | PCO | 132 | TLV |
| Bearer Contexts to be created(M) | 93 | | | |
| Charging ID | 94 | Charging Id | 127 | TV |
| Recovery | 3 | Recovery | 14 | TV |
| FQ-CSID | 132 | | | |
| User CSG Information(UCI) | 145 | User CSG Information(UCI) | 194 | TLV |
| Charging Characteristics | 95 | Charging Characteristics | 26 | TV |
| Private Extension | 255 | Private Extension | 255 | TLV |
| Flow QOS | 81 | QOS profile | 135 | TLV |
| TFT | 84 | TFT | 137 | TLV |
| Bearer QOS | 80 | QOS Profile | 135 | TLV |
| UE Timezone | 114 | MS Timezone | 153 | TLV |
| Change Reporting Action | 131 | MS Info Change Reporting Action | 181 | TLV |
| CSG Informartion Reporting Action | 146 | CSG Informartion Reporting Action | 195 | TLV |
| Charging Gateway Name(FQDN) | 136 | FQDN | 190 | TLV |
| Charging Gateway Address(IP Addr) | 74 | Charging Gateway Address | 251 | TLV |
| PGW Back-Off Time(EPC Timer) | 156 | GGSN Back-off Time | 202 | TLV |
| MME/S4-SGSN Identifier(IP Address) | 74 | | | |
| Signaling Priority Indication | 157 | Signaling Priority Indication | 203 | TLV |
| Procedure Transaction Id(PTI) | 100 | Correlation Id | 183 | TLV |
| ULI Timestamp | 170 | ULI Timestamp | 214 | TLV |
| Traffic Aggregate Description(TAD) | 85 | TFT | 137 | TLV |
| Trace Information | 96 | Trace Reference; Trace Type | | |
| Indication Flags | 77 | Common Flags | 148 | TLV |
| Bearer Flags | 97 | Extended Common flags | 193 | TLV |
| | | DT flags | 182 | TLV |

The modules, components, systems, and apparatuses disclosed by the present disclosure can take the form of one or more hardware components, one or more software components, or may include both hardware and software components. In accordance with an aspect of the present disclosure, software may include, but is not limited to, firmware, resident software, and microcode, which may include one or more instructions that may be executed by a processor or any other component or device configured to execute computer-readable instructions. Likewise, the modules, components, systems, and apparatuses disclosed by the present disclosure may be configured to execute the various methods or methodologies disclosed herein.

Furthermore, the disclosure can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-readable medium can be an electronic, magnetic, optical, electromagnetic, infrared, or semiconductor system (or apparatus or device) or a propagation medium. Examples of a computer-readable medium may include, but are not limited to, a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-RAN) and Digital Versatile Disk (DVD), those these examples are in no way limiting.

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above. Furthermore, the elements and acts of the various systems, methods, and apparatuses described above can be combined to provide further aspects. These and other changes can be made in light of the above detailed description.

Provided above for the edification of those of ordinary skill in the art, and not as a limitation on the scope of the disclosure, are detailed illustrations of a scheme for LTE roaming. Numerous variations and modifications within the spirit of the present disclosure will of course occur to those of ordinary skill in the art in view of the embodiments that have been disclosed.

For example, the present disclosure may be implemented with a non-LTE HPMN 104 or when a subscriber is roaming in a VPMN without an LTE roaming agreement with the HPMN, as described above. However, the present disclosure may also be effectively implemented with an LTE-capable HPMN 104 or any other network of common carrier telecommunications in which end-users are configured to operate within a home network to which they normally subscribe, but which have the capability of also operating on other neighboring networks, which may even be across international borders.

The examples presented by the disclosure are described using terms and constructs drawn largely from the EPS mobile telephony infrastructure. However, use of these examples should not be interpreted as limiting the disclosure to those media. The system and method can be of use and provided through any type of telecommunications medium, including, but not limited to: (i) any mobile telephony network (including, but not limited to, GSM, 3GSM, 3G, CDMA, WCDMA or GPRS, satellite phones or other mobile telephone networks or systems); (ii) any WiFi apparatus or access point (e.g., as utilized in a home or subscribed network, but also configured for use on a visited or non-home or non-accustomed network), including apparatuses not dedicated to telecommunications (e.g., personal computers, Palm-type or Windows Mobile devices); (iii) an entertainment console platform such as Sony Playstation, PSP or other apparatus that are capable of sending and receiving telecommunications over home or non-home networks; and/or (iv) fixed-line devices made for receiving communications and capable of deployment in numerous locations while preserving a persistent subscriber ID (e.g., telecommunications equipment meant for voice over IP (VoIP) communications).

In the foregoing specification, specific embodiments of the present disclosure have been described. However, one of ordinary skill in the art will appreciate that various modifications and changes can be made without departing from the scope of the present disclosure as set forth in the claims below. Accordingly, the specification and the figures are to be regarded in an illustrative rather than a restrictive sense, and all such modifications are intended to be included within the scope of present disclosure. The benefits, advantages, solutions to problems, and any element(s) that may cause any benefit, advantage, or solution to occur, or to become more pronounced, are not to be construed as a critical, required, or essential feature or element of any or all of the claims.

Furthermore, the following documents published by the 3GPP or GSMA are hereby incorporated by reference: 3GGP TS 29.002, 3GPP TS 29.272, 3GPP TS 29.305, 3GPP TS 33.401, 3GPP TS 23.401, 3GPP TS 23.060, 3GPP TS 29.060, 3GPP TS 29.274, 3GPP TS 29.061, 3GPP TS 29.118, 3GPP TS 29.338, and GSMA IR.88.

APPENDIX

Acronyms Used:

| Acronym | Description |
|---|---|
| 3G | Third generation of mobile |
| ACM | ISUP Address Completion Message |
| ANM | ISUP Answer Message |
| ANSI-41 | American National Standards Institute #41 |
| ATI | Any Time Interrogation |
| BCSM | Basic Call State Model |
| BGW | Border GateWay |
| BSC | Base Station Controller |
| BOIC | Barring Outgoing International Calls |
| BOIC-EX-Home | Barring Outgoing International Calls except to home country |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CDR | Call Detail Record |
| CF | Call Forwarding |
| CgPA | Calling Party Address |
| CIC | Circuit Identification Code |
| CK | Ciphering Key |
| CLI | Calling Line Identification |
| CSD | Circuit Switched Data |
| CSI | Camel Subscription Information |
| DPC | Destination Point Code |
| DSD | Delete Subscriber Data |
| DEA | Diameter Edge Agent |
| DRA | Diameter Routing Agent |
| DTMF | Dual Tone Multi-Frequency |
| EPC | Evolved Packet Core |
| EPS | Evolved Packet System |
| ERB | CAP Event Report Basic call state model |
| EU | European Union |
| E-UTRAN | Evolved Universal Terestrial Radio Access Network |
| FPMN | Friendly Public Mobile Network |
| FTN | Forward-To-Number |
| GLR | Gateway Location Register |
| GGSN | Gateway GPRS Support Node |
| GMSC | Gateway MSC |
| GMSC-F | GMSC in FPMN |
| GMSC-H | GMSC in HPMN 104 |
| GPRS | General Packet Radio System |
| GSM | Global System for Mobile |
| GSMA | GSM Association |

APPENDIX-continued

Acronyms Used:

| Acronym | Description |
|---|---|
| GSM SSF | GSM Service Switching Function |
| GsmSCF | GSM Service Control Function |
| GT | Global Title |
| GTP | GPRS Tunnel Protocol |
| HLR | Home Location Register |
| HPMN 104 | Home Public Mobile Network |
| GTT | Global Title Translation |
| IAM | Initial Address Message |
| IDP | Initial DP IN/CAP message |
| IDD | International Direct Dial |
| IK | Integrity Key |
| IMSI | International Mobile Subscriber Identity |
| IMSI-H | HPMN 104 IMSI |
| IN | Intelligent Network |
| INAP | Intelligent Network Application Part |
| INE | Interrogating Network Entity |
| IOT | Inter-Operator Tariff |
| IP | Internet Protocol |
| IP-SM-GW | IP Short Message Gateway |
| IREG | International Roaming Expert Group |
| IRS | International Revenue Share |
| ISC | International Service Carrier |
| ISD | MAP Insert Subscriber Data |
| ISG | International Signal Gateway |
| IST | Immediate Service Termination |
| ISTP | International STP |
| ISTP-F | ISTP connected to FPMN STP |
| ISTP-H | ISTP connected to HPMN 104 STP |
| ISUP | ISDN User Part |
| ITPT | Inbound Test Profile Initiation |
| ITR | Inbound Traffic Redirection |
| IVR | Interactive Voice Response |
| KASME | Key Access Security Management Entity |
| LTE | Long Term Evolution |
| LU | Location Update |
| LUP | MAP Location Update |
| MAP | Mobile Application Part |
| MCC | Mobile Country Code |
| MCC | Mobile Country Code |
| MD | Missing Data |
| ME | Mobile Equipment |
| MGT | Mobile Global Title |
| MMS | Multimedia Message Service |
| MMSC | Multimedia Message Service Center |
| MMSC-F | FPMN MMSC |
| MMSC-H | HPMN 104 MMSC |
| MNC | Mobile Network Code |
| MNP | Mobile Number Portability |
| MO | Mobile Originated |
| MOS | Mean Opinion Score |
| MS | Mobile Station |
| MSC | Mobile Switching Center |
| MSISDN | Mobile Station International Subscriber Directory Number |
| MSISDN-F | FPMN MSISDN |
| MSISDN-H | HPMN 104 MSISDN |
| MSRN | Mobile Station Roaming Number |
| MSRN-F | FPMN MSRN |
| MSRN-H | HPMN 104 MSRN |
| MT | Mobile Terminated |
| MTP | Message Transfer Part |
| NDC | National Dialing Code |
| NP | Numbering Plan |
| NPI | Numbering Plan Indicator |
| NRTRDE | Near Real Time Roaming Data Exchange |
| O-CSI | Originating CAMEL Subscription Information |
| OCN | Original Called Number |
| ODB | Operator Determined Barring |
| OPC | Origination Point Code |
| OR | Optimal Routing |
| ORLCF | Optimal Routing for Late Call Forwarding |
| OTA | Over The Air |
| OTPI | Outbound Test Profile Initiation |
| PDP | Protocol Data Packet |
| PDN | Packet Data Network |
| PDU | Packet Data Unit |

APPENDIX-continued

Acronyms Used:

| Acronym | Description |
|---|---|
| PRN | MAP Provide Roaming Number |
| PSI | MAP Provide Subscriber Information |
| QoS | Quality of Service |
| RAEX | Roaming Agreement Exchange |
| RI | Routing Indicator |
| RIS | Roaming Intelligence System |
| RDN | Redirecting Number |
| RNA | Roaming Not Allowed |
| RR | Roaming Restricted due to unsupported feature |
| RRB | CAP Request Report Basic call state model |
| RSD | Restore Data |
| RTP | Real-Time Transport Protocol |
| SAI | Send Authentication Info |
| SC | Short Code |
| SCA | Smart Call Assistant |
| SCCP | Signal Connection Control part |
| SCP | Signaling Control Point |
| SF | System Failure |
| SG | Signaling Gateway |
| SGSN | Serving GPRS Support Node |
| SGSN-F | FPMN SGSN |
| SIM | Subscriber Identity Module |
| SIGTRAN | Signaling Transport Protocol |
| SME | Short Message Entity |
| SM-GSMC | Short Message Gateway MSC |
| SM-RP-UI | Short Message Relay Protocol User Information |
| SMS | Short Message Service |
| SMSC | Short Message Service Center |
| SMSC-F | FPMN SMSC |
| SMSC-H | HPMN 104 SMSC |
| SN id | Serving Network identity |
| SoR | Steering of Roaming |
| SPC | Signal Point Code |
| SRI | MAP Send Routing Information |
| SRI-SM | MAP Send Routing Information For Short Message |
| SS | Supplementary Services |
| SS7 | Signaling System #7 |
| SSN | Sub System Number |
| SSP | Service Switch Point |
| STK | SIM Tool Kit Application |
| STP | Signal Transfer Point |
| STP-F | FPMN STP |
| STP-H | HPMN 104 STP |
| TADIG | Transferred Account Data Interchange Group |
| TAP | Transferred Account Procedure |
| TCAP | Transaction Capabilities Application Part |
| VT-CSI | Visited Terminating CAMEL Service Information |
| TP | SMS Transport Protocol |
| TR | Traffic Redirection |
| TS | Traffic Steering |
| TT | Translation Type |
| UD | User Data |
| UDH | User Data Header |
| UDHI | User Data Header Indicator |
| UMTS | Universal Mobile Telecommunication System |
| USSD | Unstructured Supplementary Service Data |
| VAS | Value Added Service |
| VIP | Very Important Person |
| VLR | Visited Location Register |
| VLR-F | FPMN VLR |
| VLR-H | HPMN 104 VLR |
| VLR-V | VPMN VLR |
| VMSC | Visited Mobile Switching Center |
| VoIP | Voice over IP |
| VPMN | Visited Public Mobile Network |
| ATI | Access Transport Information |
| UDV | Unexpected Data Value |
| USI | User Service Information |
| WAP | Wireless Access Protocol |

We claim:

1. A method for managing mobile device roaming, comprising:

receiving, at a gateway associated with a Long-Term Evolution (LTE) compatible Visited Public Mobile Network (VPMN), a request message from an LTE device associated with a non-LTE compatible Home Public Mobile Network (HPMN), wherein the request message requests wireless access to an LTE access network associated with the VPMN;

enabling, at the gateway, registration of the LTE device to the LTE access network associated with the VPMN; and providing, at the gateway, an Internet Protocol (IP) connection to the LTE device, wherein a roaming hub is deployed between the HPMN and the VPMN in order to enable outbound roaming of a subscriber equipped with the LTE device associated with the HPMN into the LTE access network associated with the VPMN;

wherein an LTE roaming agreement exists between the VPMN and the roaming hub, wherein no LTE roaming agreement exists between the roaming hub and the HPMN, and wherein an LTE roaming agreement between the HPMN and the VPMN does not exist, and wherein the roaming hub is configured to execute an interworking function between a Diameter S6a interface towards a Mobility Management Entity (MME) of the VPMN and a Mobile Application Part (MAP) Gr interface towards an Home Location Register (HLR) of the HPMN.

2. The method of claim 1, further comprising tunneling the IP connection back to the HPMN.

3. The method of claim 1, wherein the IP connection is local to the VPMN.

4. The method of claim 1, wherein enabling registration of the LTE device further comprises interworking between the Diameter S6a interface and the Gr interface.

5. The method of claim 4, further comprising:
rejecting, at the gateway, a MAP-Mobile Terminating-Forward-Short Message request message with a configurable user error; and
forcing, at the gateway, a Short Message Service (SMS) Controller, an SMS Router, or an IP Short Message Gateway to deliver a short message through IP Multimedia Subsystem or a Visited Mobile Switching Center.

6. The method of claim 4, wherein the HLR associated with the HPMN comprises a pre-Third Partnership Project (3GPP) Release-8 HLR that is incompatible with 3GPP Release 8 Evolved Packet System (EPS) security and does not support transfer of 3GPP Release-8 security parameters.

7. The method of claim 4, further comprising:
replacing, via the gateway, one or more 3G authentication vectors in a MAP Send Authentication Information Response message received from a Home Location Register in the HPMN with Evolved Packet System (EPS) authentication vectors; and
sending, via the gateway, the EPS authentication vectors to the MME in the VPMN in a Diameter Authentication-Information-Answer message.

8. The method of claim 4, further comprising:
replacing, by the gateway, General Packet Radio Service subscription information in a MAP Insert Subscriber Data Request message received from a Home Location Register of the HPMN with Evolved Packet System (EPS) subscription information; and
sending, by the gateway, the EPS subscription information to the MME in VPMN in a Diameter Update-Location-Answer message.

9. The method of claim 1, further comprising interworking, via the gateway, between a GTPv2-c S8 interface and a GTPv1-c interface.

10. The method of claim 9, further comprising connecting, via the gateway, a serving gateway in the VPMN and a gateway GPRS support node in the HPMN.

11. The method of claim 9, further comprising connecting, via the gateway, a serving gateway in the VPMN with a gateway GPRS support node or a packet data network gateway in the VPMN.

12. The method of claim 9, further comprising connecting, via the gateway, a serving gateway in the HPMN and a gateway GPRS support node in the HPMN.

13. A gateway apparatus associated with a Long-Term Evolution (LTE) compatible Visited Public Mobile Network (VPMN) for managing mobile device roaming, wherein the gateway apparatus is configured to:
receive a request message from an LTE device associated with a non-LTE compatible Home Public Mobile Network (HPMN), wherein the request message requests wireless access to an LTE access network associated with the VPMN;
enable registration of the LTE device to the LTE access network associated with the VPMN; and
provide an Internet Protocol (IP) connection to the LTE device, wherein a roaming hub is deployed between the HPMN and the VPMN in order to enable outbound roaming of a subscriber equipped with the LTE device associated with the HPMN into the LTE access network associated with the VPMN;
wherein an LTE roaming agreement exists between the VPMN and the roaming hub, wherein no LTE roaming agreement exists between the roaming hub and the HPMN, and wherein an LTE roaming agreement between the HPMN and the VPMN does not exist, and
wherein the roaming hub is configured to execute an interworking function between a Diameter S6a interface towards a Mobility Management Entity (MME) of the VPMN and a Mobile Application Part (MAP) Gr interface towards an Home Location Register (HLR) of the HPMN.

14. The gateway apparatus of claim 13, wherein the gateway apparatus is further configured to tunnel the IP connection back to the HPMN.

15. The gateway apparatus of claim 13, wherein the IP connection is local to the VPMN.

16. The gateway apparatus of claim 13, wherein the gateway apparatus is further configured to execute interworking between the Diameter S6a interface and the MAP Gr interface.

17. The gateway apparatus of claim 16, wherein the gateway apparatus is further configured to:
reject a MAP-Mobile Terminating-Forward-Short Message request message with a configurable user error; and
force a Short Message Service (SMS) Controller, an SMS Router, or an IP Short Message Gateway to deliver a short message through IP Multimedia Subsystem or a Visited Mobile Switching Center.

18. The gateway apparatus of claim 16, wherein the gateway apparatus is further configured to communicate with the HLR associated with the HPMN, wherein the HLR comprises a pre-Third Partnership Project (3GPP) Release-8 HLR that is incompatible with 3GPP Release 8 Evolved Packet System (EPS) security and does not support transfer of 3GPP Release-8 security parameters.

19. The gateway apparatus of claim 16, wherein the gateway apparatus is further configured to:
replace one or more 3G authentication vectors in a MAP Send Authentication Information Response message received from a Home Location Register in the HPMN with Evolved Packet System (EPS) authentication vectors; and send the EPS authentication vectors to the MME in the VPMN in a Diameter Authentication-Information-Answer message.

20. The gateway apparatus of claim 16, wherein the gateway apparatus is further configured to:

replace General Packet Radio Service subscription information in a MAP Insert Subscriber Data Request message received from a Home Location Register of the HPMN with Evolved Packet System (EPS) subscription information; and send the EPS subscription information to the MME in VPMN in a Diameter Update-Location-Answer message.

21. The gateway apparatus of claim 13, wherein the gateway apparatus is further configured to execute interworking between a GTPv2-c S8 interface and a GTPv1-c interface.

22. The gateway apparatus of claim 21, wherein the gateway apparatus is further configured to connect a serving gateway in the VPMN and a gateway GPRS support node in the HPMN.

23. The gateway apparatus of claim 21, wherein the gateway apparatus is further configured to connect a serving gateway in the VPMN with a gateway GPRS support node or a packet data network gateway in the VPMN.

24. The gateway apparatus of claim 21, wherein the gateway apparatus is further configured to connect a serving gateway in the HPMN and a gateway GPRS support node in the HPMN.

* * * * *